United States Patent
Leidich et al.

(10) Patent No.: US 9,868,537 B2
(45) Date of Patent: Jan. 16, 2018

(54) RISER RELEASE FLARING SYSTEM FOR PARAFOILS

(71) Applicant: World View Enterprises Inc., Tucson, AZ (US)

(72) Inventors: Jared Leidich, Denver, CO (US); Daniel W. McFatter, Tucson, AZ (US); Kyler Quinn Felton, Tucson, AZ (US)

(73) Assignee: World View Enterprises Inc., Tucson, AZ (US)

( * ) Notice: Subject to any disclaimer, the term of this patent is extended or adjusted under 35 U.S.C. 154(b) by 0 days.

(21) Appl. No.: 15/486,241

(22) Filed: Apr. 12, 2017

(65) Prior Publication Data

US 2017/0297724 A1    Oct. 19, 2017

Related U.S. Application Data

(60) Provisional application No. 62/322,150, filed on Apr. 13, 2016.

(51) Int. Cl.
*B64D 17/38* (2006.01)
*B64D 17/02* (2006.01)
(Continued)

(52) U.S. Cl.
CPC .......... *B64D 17/38* (2013.01); *B64D 17/025* (2013.01); *B64D 17/343* (2013.01); *B64D 17/80* (2013.01); *B64B 1/44* (2013.01)

(58) Field of Classification Search
CPC ...... B64D 17/386; B64D 17/34; B64D 17/38; B64D 17/22; B64D 17/24; B64D 17/025; B64D 17/343; B64D 17/80
See application file for complete search history.

(56) References Cited

U.S. PATENT DOCUMENTS

| 1,308,033 A | 7/1919 | Benton |
| 1,353,131 A * | 9/1920 | Ruff ............... B64D 17/34 244/142 |

(Continued)

FOREIGN PATENT DOCUMENTS

| CN | 2844003 | 12/2006 |
| CN | 200988579 | 12/2007 |

(Continued)

OTHER PUBLICATIONS

Google, "troposphere"; https://www.google.com/search?q=troposphere, accessed Jun. 2, 2017.*

(Continued)

*Primary Examiner* — Tien Q Dinh
*Assistant Examiner* — Alexander V. Giczy
(74) *Attorney, Agent, or Firm* — Knobbe, Martens, Olson & Bear, LLP

(57) ABSTRACT

A riser release system controllably lands a descending flight vehicle having a parafoil or canopy. The system has control lines and riser lines attached to the parafoil or canopy. The other end of the riser lines are attached to an upper portion of a release structure; a lower portion of the release structure is connected to the payload; and a coupling mechanisms releasably couples the upper and lower portions. When the upper and lower portions are decoupled, a distance control device controls and limits the distance of separation between the two portions, and a rate control device controls the rate of separation. Separation causes the riser lines to increase the distance between the payload and canopy, further causing the canopy to flare and decrease the rate of descent of the flight vehicle.

18 Claims, 21 Drawing Sheets

(51) Int. Cl.
  *B64D 17/80* (2006.01)
  *B64D 17/34* (2006.01)
  *B64B 1/44* (2006.01)

(56) References Cited

U.S. PATENT DOCUMENTS

| | | | |
|---|---|---|---|
| 1,378,198 A * | 5/1921 | Smith | B64D 17/34 244/152 |
| 1,705,854 A | 3/1929 | Coughlin | |
| 1,829,561 A | 10/1931 | Knight | |
| 2,083,743 A | 6/1937 | Poole | |
| 2,458,264 A * | 1/1949 | Hart | B64D 17/00 244/152 |
| 2,477,907 A * | 8/1949 | Smith | B64D 17/34 244/139 |
| 2,517,488 A * | 8/1950 | Horning | B64D 17/34 244/152 |
| 2,626,117 A | 1/1953 | Heinrich | |
| 2,680,577 A * | 6/1954 | Frieder | B64D 17/38 182/236 |
| 2,753,042 A * | 7/1956 | Wellcome | B64D 17/38 206/397 |
| 3,117,753 A * | 1/1964 | Ewing | B64D 17/025 244/145 |
| 3,302,973 A * | 2/1967 | Ravau | B60R 22/16 244/151 R |
| 3,829,045 A * | 8/1974 | Snyder | B64D 17/025 244/152 |
| 3,829,046 A * | 8/1974 | Matsuo | B64D 17/34 244/152 |
| 4,247,143 A * | 1/1981 | Putman | B64D 17/38 294/82.25 |
| 4,399,969 A | 8/1983 | Gargano | |
| 4,619,424 A * | 10/1986 | Twardawa | B64D 17/38 244/151 B |
| 4,722,497 A | 2/1988 | Stanford et al. | |
| 4,865,274 A | 9/1989 | Fisher | |
| 5,028,018 A | 7/1991 | Krebber | |
| 5,244,169 A | 9/1993 | Brown et al. | |
| 5,362,017 A | 11/1994 | Puckett | |
| 5,620,153 A | 4/1997 | Ginsberg | |
| 5,718,399 A | 2/1998 | Cheng | |
| 5,893,536 A | 4/1999 | Lee et al. | |
| 5,904,324 A * | 5/1999 | Di Bella | B64D 17/34 244/142 |
| 6,220,547 B1 | 4/2001 | Smith et al. | |
| 6,364,251 B1 | 4/2002 | Yim | |
| 6,565,042 B1 | 5/2003 | Yamada | |
| 6,626,400 B1 | 9/2003 | Booth | |
| 6,705,572 B1 | 3/2004 | Christopher | |
| 6,805,323 B2 * | 10/2004 | Preston | B64D 17/343 244/142 |
| 7,461,817 B1 * | 12/2008 | Hansson | B64D 17/383 244/151 B |
| 8,448,898 B1 | 5/2013 | Frolov et al. | |
| 9,033,281 B1 | 5/2015 | Adams | |
| D739,333 S | 9/2015 | Goode et al. | |
| D739,334 S | 9/2015 | Goode et al. | |
| 9,139,279 B2 | 9/2015 | Heppe | |
| 9,540,091 B1 | 1/2017 | MacCallum et al. | |
| 9,561,858 B2 | 2/2017 | Leidich et al. | |
| 2001/0004097 A1 * | 6/2001 | Schwarzler | B64D 17/34 244/142 |
| 2002/0166925 A1 * | 11/2002 | Benney | B64D 17/00 244/142 |
| 2004/0169111 A1 * | 9/2004 | Christof | B64D 17/34 244/152 |
| 2005/0230555 A1 | 10/2005 | Strong | |
| 2007/0257155 A1 * | 11/2007 | Sadeck | B64D 1/14 244/142 |
| 2007/0272801 A1 | 11/2007 | Hilliard et al. | |
| 2009/0108135 A1 | 4/2009 | Shaw | |
| 2009/0134277 A1 | 5/2009 | Kim et al. | |
| 2009/0206196 A1 | 8/2009 | Parks et al. | |
| 2010/0163682 A1 | 7/2010 | Jameson | |
| 2012/0168565 A1 | 7/2012 | Berland | |
| 2012/0305713 A1 * | 12/2012 | Deazley | B64D 17/34 244/152 |
| 2013/0325213 A1 * | 12/2013 | Mamidipudi | B64C 19/00 701/3 |
| 2015/0284065 A1 | 10/2015 | MacCallum et al. | |
| 2016/0018823 A1 | 1/2016 | Longmier et al. | |
| 2016/0090179 A1 | 3/2016 | Childress et al. | |
| 2016/0137303 A1 * | 5/2016 | Pullam | G06K 9/00791 701/4 |
| 2016/0176531 A1 * | 6/2016 | Biehl | B64D 17/025 244/151 R |
| 2016/0264248 A1 | 9/2016 | MacCallum et al. | |

FOREIGN PATENT DOCUMENTS

| | | | |
|---|---|---|---|
| CN | 202765296 | 3/2013 | |
| DE | 38 05 645 | 7/1988 | |
| DE | 39 27 297 | 2/1991 | |
| DE | 19634017 | 2/1998 | |
| FR | 2 724 909 | 3/1996 | |
| GB | 191207587 | 9/1912 | |
| GB | 1505086 A * | 3/1978 | B64D 17/38 |
| GB | 2184699 | 7/1987 | |
| KR | 10-1699797 | 2/2017 | |
| RU | 2 112 709 | 6/1998 | |

OTHER PUBLICATIONS

Aerospace-Technology.com: "World View Successfully Completes Test Flight for Commercial Balloon Flights," Aerospace-Technology.com, online article dated Oct. 27, 2015. http://www.aerospace-technology.com/news/newsworld-view-test-flights-commercial-balloon-flight-4702892.

Aljazeera America: "Space tourism company breaks record with high-altitude balloon flight", online article dated Jun. 25, 2014. http://america.aljazeera.com/articles/2014/6/25/balloonspace-tourism.html.

Benton, J. et al.: "On Development of Autonomous HAHO Parafoil System for Targeted Payload Return", AIAA Aerodynamic Decelerator Systems (ADS) Conference, Mar. 2013, in 26 pages.

Berger, E.: "Record-Breaking Balloon Flight", Outside Online, online article dated Jun. 25, 2014. http://www.outsideonline.com/1804196/record-breakingballoon-flight.

Boyle, A.: "Heads Up, Strato-Tourists: World View Begins High-Flying Tests", NBC News, online article dated Jun. 24, 2014. http://www.nbcnews.com/science/space/heads-stratotourists-world-view-begins-high-flying-tests-n138986.

Boyle, A.: "World View Balloon Lofts NASA Experiments to Near-Space Heights," NBC News, online article dated Mar. 9, 2015. http://www.nbcnews.com/science/space/world-view-balloon-lofts-nasa-experiments-near-space-heights-n320216.

Clausing, J.: "Arizona company successfully tests high-altitude balloon for space tourism", US News, online article dated Jun. 24, 2014. http://www.usnews.com/news/business/articles/2014/06/24/company-successfully-tests-space-tourism-balloon.

Denuder, M.: "Development of a Paraglide-Deployment System for a Base Jumping Robot", Bachelor-Thesis, Swiss Federal Institute of Technology Zurich, Jun. 2011, in 111 pages.

Etherington, D.: "World View's 'stratollites' and new spaceport aim to change the business of space", TechCrunch, posted Feb. 23, 2017, in 9 pages. URL: https://techcrunch.com/2017/02/23/world-views-stratollites-and-new-spaceport-aim-to-change-the-business-of-space/.

Foust, J.: "World View tests scale model of its high-altitude balloon system", NewSpace Journal, online article dated Jun. 24, 2014. http://www.newspacejournal.com/2014/06/24/worldview-tests-scale-model-of-its-high-altitude-balloon-system/.

Gannon, M.: "World View Launches Test Balloon to Edge of Space, Breaks Record", Space.com, online article dated Jun. 24, 2014. http://www.space.com/26340-world-view-balloon-testflight-record.html.

(56) References Cited

OTHER PUBLICATIONS

Haugen, J.: "After Successful Flight Test, World View Ready for Next Phase: The Stratospheric Tourism Company Is Setting Its Sights High," Popular Science, online article dated Oct. 26, 2015. http://www.popsci.com/world-view-completes-first.
Howell, E.: "World View Makes Record-Setting Parafoil Flight from Near Edge of Space," Space.com, online article dated Feb. 21, 2015. http://www.space.com/28626-world-view-parafoil-record-flight.html.
Howell, E.: "World View Parafoil Test Flight Touches Edge of Space," Discovery News, online article dated Feb. 23, 2015. http://www.seeker.com/world-view-parafoil-test-flight-touches-edge-of-space-1769541739.html#news.discovery.com.
Klotz, I.: "World View Prototype Balloon Reaches for Edge of Space", Seeker, online article dated Jun. 25, 2014. http://www.seeker.com/world-view-prototype-balloon-reaches-for-edge-of-space-1768745428.html#news.discovery.com.
Knapp, A.: "World View Has a Successful Scaled Test Flight of Its Balloon to Space", Forbes, online article dated Jun. 24, 2014. http://www.forbes.com/sites/alexknapp/2014/06/24/world-view-has-a-successful-scaled-test-flight-of-its-balloon-tospace/#4e726063f229.
Larimer, S.: "Company takes test flight to the least-crowded tourism hot spot: space", The Washington Post, online article dated Jun. 27, 2014. http://www.washingtonpost.com/news/postnation/wp/2014/06/27/company-takes-test-flight-to-theleast-crowded-tourism-hot-spot-space/.
Lawler, R.: "Google exec sets a new record for highest-altitude jump (video)", Engadget, online article published Oct. 24, 2014. https://www.engadget.com/2014/10/24/google-exec-alan-eustace-stratex-high-altitude-jump/.
Logan, M.: "Flight Brings Us Closer to Balloon-Powered Space Tourism", online article dated Feb. 3, 2015. http://www.wired.com/2015/03/parafoil-world-view/.
Markoff, J.: "Parachutist's Record Fall: Over 25 Miles in 15 Minutes", The New York Times, online article published Oct. 24, 2014. http://www.nytimes.com/2014/10/25/science/alan-eustace-jumps-from-stratosphere-breaking-felix-baumgartners-world-record.html?_r=1.
Moon, M.: "World View Tests a Small Version of Its Balloon-powered Spacecraft," MSN News, online article dated Oct. 27, 2015. http://www.msn.com/en-us/news/technology/world-view-tests-a-small-version-of-its-balloon-powered-spacecraft/ar-BBmtkdA.
New Atlas: "Google exec sets new high-altitude skydiving world record", New Atlas, online article published Oct. 26, 2014. http://newatlas.com/alan-eustace-world-record-skydive-stratex/34423/pictures.
NuancedAdmin: "Paragon Completes Record-Breaking Near-Space Dive Via High-Altitude Balloon", Paragon Space Development Corporation, press release dated Oct. 20, 2015.
O'Callaghan, J.: "Balloon Capsule That Will Take People to the Edge of Space Completes Test Flight," IFLScience!, online article dated Oct. 28, 2015. http://www.iflscience.com/space/balloon-will-take-people-edge-space-capsule-completes-test-flight/.
Photograph of a parafoil in high altitude flight (assumed to be prior art, but applicant reserves right to confirm actual date of photograph and to dispute status as prior art).
PR Newswire: "World View and Ball Aerospace Demonstrate Persistent Remote Sensing from Stratollite Platform", Yahoo Finance, posted Feb. 23, 2017, in 8 pages. URL: http://finance.yahoo.com/news/world-view-ball-aerospace-demonstrate-220000300.html.
U.S. Appl. No. 15/401,447, filed Jan. 9, 2017 (Unpublished).
U.S. Appl. No. 15/411,841, filed Jan. 20, 2017 (Unpublished).
Wikipedia Commons: "File: Le premier parachute de Jacques Garnerin, ca. 1799.jpg", uploaded Aug. 12, 2010, in 3 pages. https://en.wikipedia.org/wiki/File:Le_premier_parachute_de_Jacques_Garnerin,_ca._1799.jpg.
World View: "Landmark Space Dive Sets Stage for World View Space Flights", World View, press release dated Oct. 24, 2014.
World View: "Major World View Test Flight Readies the Company to Begin Full Scale Flight Testing for Human Private Spaceflights", World View, press release dated Oct. 26, 2015.
World View: "Oct. 24, 2015 Milestone 10% Scale Test Flight", YouTube, published Oct. 24, 2015 (footage of parafoil seen in video), video can be accessed at https://www.youtube.com/watch?v=1-PpJHKHAQc (last accessed: Jul. 13, 2016).
World View: "The Stratollite", YouTube, published Feb. 23, 2017, video can be accessed at https://www.youtube.com/watch?v=GFdXBQPuznU (last accessed Mar. 15, 2017).
World View: "World View Breaks World Record with Successful Test Flight for 2016 Journeys to Edge of Space", World View, press release dated Jun. 24, 2014.
World View: "World View Breaks World Record with Successful Test Flight", YouTube, published Jun. 23, 2014 (footage of parafoil in space seen in video), video can be accessed at https://www.youtube.com/watch?v=sdsVwN-ICX8 (last accessed: Jul. 13, 2016).
World View: "World View One Step Closer to Manned Near-Space Voyages with Record-Breaking Flight", World View, press release dated Feb. 20, 2015.
International Search Report and Written Opinion dated Jul. 17, 2017 for International Application No. PCT/US2017/027264 filed Apr. 12, 2017, 8 pages.

* cited by examiner

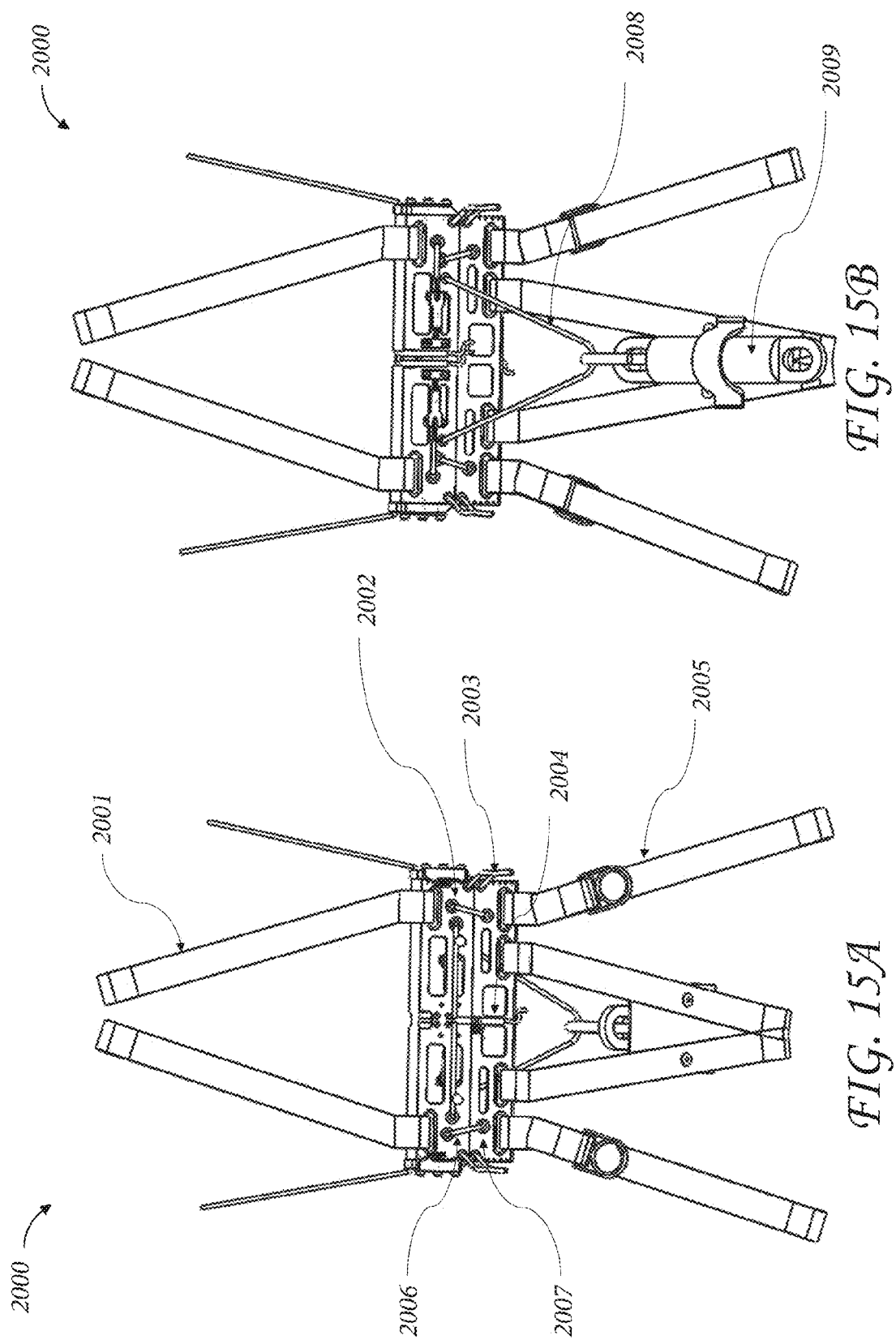

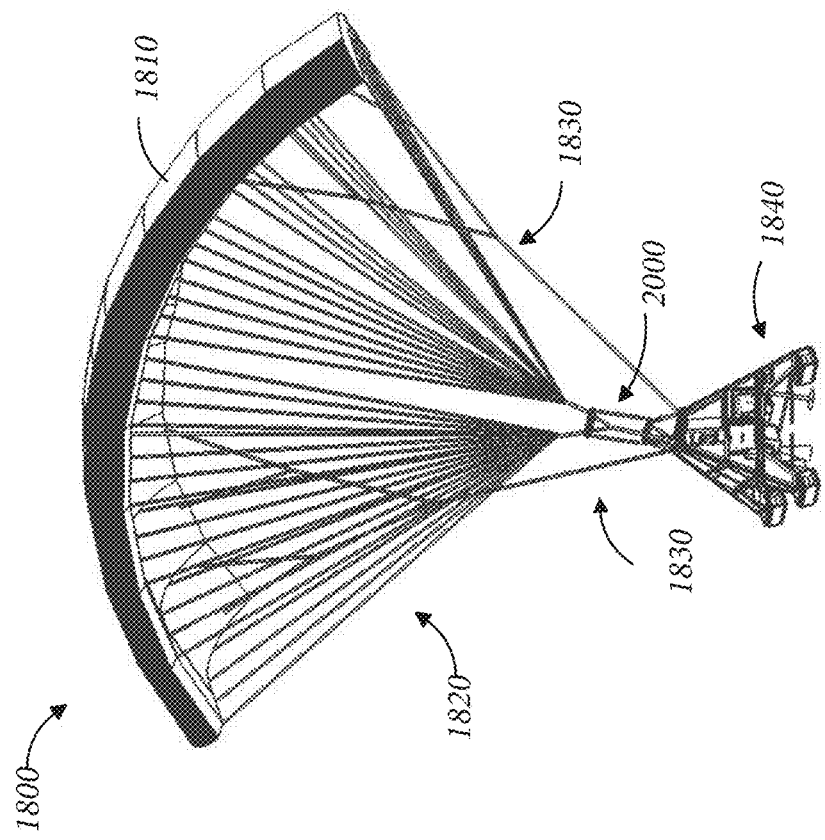
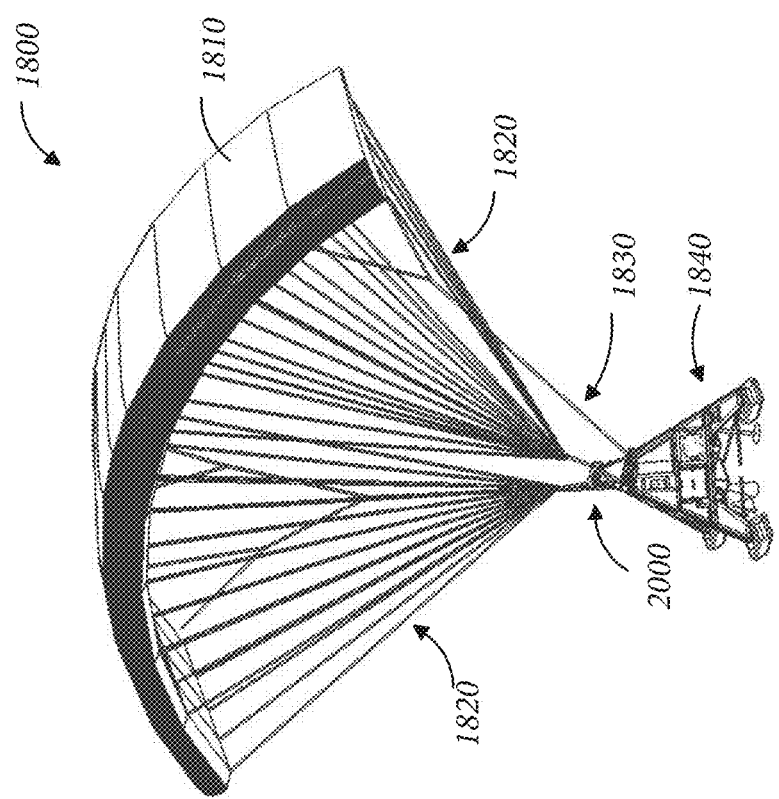
FIG. 16B
FIG. 16A

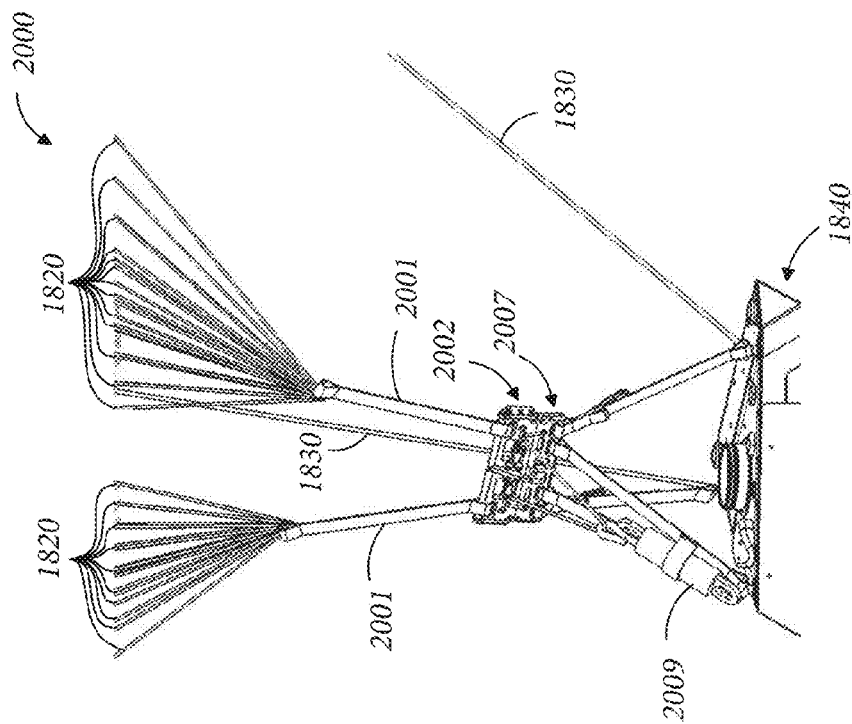
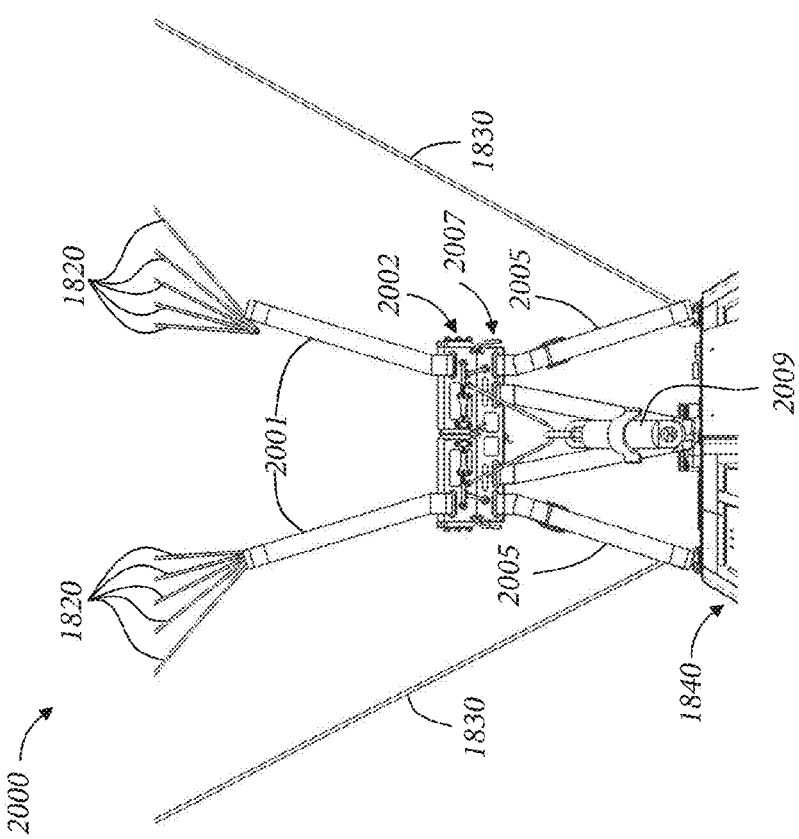

RISER RELEASE FLARING SYSTEM FOR PARAFOILS

INCORPORATION BY REFERENCE TO ANY RELATED APPLICATIONS

Any and all applications for which a foreign or domestic priority claim is identified in the Application Data Sheet as filed with the present application are hereby incorporated by reference in their entirety under 37 CFR 1.57.

This application claims the benefit of priority to U.S. provisional patent application No. 62/322,150, entitled RISER RELEASE FLARING SYSTEM FOR PARAFOILS, and filed Apr. 13, 2016, the disclosure of which is hereby incorporated by reference herein in its entirety for all purposes and forms a part of this specification.

BACKGROUND

Field

The technology relates generally to flight, in particular to systems and methods for descent and landing of flight vehicles.

Description of the Related Art

Flight vehicles, such as parafoils and other vehicles, are of interest for many applications, including communications, scientific research, meteorology, reconnaissance, tourism, and others. These and other applications impose strict requirements on landing the flight vehicles. Safely landing a payload on the ground with a flight vehicle can present challenges.

SUMMARY

The embodiments disclosed herein each have several aspects no single one of which is solely responsible for the disclosure's desirable attributes. Without limiting the scope of this disclosure, its more prominent features will now be briefly discussed. After considering this discussion, and particularly after reading the section entitled "Detailed Description" one will understand how the features of the embodiments described herein provide advantages over existing approaches to descent and landing of parafoils and other flight vehicles.

Various embodiments of the technology generally relate to systems to slow the landing of a descent system, such as a parafoil, and/or decrease the landing speeds of payloads delivered by the descent system. Decreasing the landing speeds of descent systems could greatly reduce landing loads and enable the delivery of more sensitive payloads.

Described herein are riser release systems and devices for descending and landing flight vehicles, such as parafoils. The flight vehicles may land from any altitude, including but not limited to landing from high altitude flight (generally above 50,000 feet), for example using lighter-than-air (LTA) systems. Therefore, as examples only, some LTA systems and methods are thus described, and it is understood that the riser release systems and methods described herein may or may not be used with the LTA systems described herein. In some embodiments, the riser release systems and methods may be used with parafoils or other flight vehicles in many different contexts. The riser release systems and methods relate to a platform having a riser release auto flare system. The riser release auto flare system enables a descent system, such as a parafoil or other descent system, to automatically flare and slow its descent and forward speed, for example by using only the weight of the payload to actuate the motion.

The riser release system may be used with an LTA system, such as a tandem balloon system. A zero-pressure balloon (ZPB) is attached in tandem with a variable air super-pressure balloon (SPB). The ZPB provides lift for the system while the SPB provides a variable amount of ballast by pumping in or expelling out ambient air. By dividing the two functions among the two separate balloons, each balloon and its associated accessories are configured for the respective balloon's particular function, allowing achievement of advanced performance targets with the LTA. For instance, a compressor provides air to the SPB and can be configured for providing a sufficient rate and volume of air at particular high altitudes in which the LTA system will be flown. Such compressor designs allow for rapid descent, as well as high pressures within the SPB which allows for rapid venting and ascent, both of which can be performed at high altitudes. As further example, configurations of the SPB skin and accompanying tendons allow for a structurally efficient and stable SPB. For instance, the SPB may be configured to assume a "pumpkin" shape during flight capable of withstanding very large internal pressures, while also providing stability to prevent issues such as deformation of the skin, including "S-clefting." These and other features of the LTA system provide the ability to both simultaneously achieve high altitude (e.g. at or above about 50,000 feet) and actively control altitude over a meaningful range (e.g. more than about 20,000 feet).

These and other features provide an LTA platform that can be scaled and configured simply for various missions and flight requirements and with safe delivery and landing of a payload using the riser release system. For instance, the basic design of the LTA system can be configured for higher altitude and/or heavy lift missions with a higher capacity multi-stage compressor and larger volume SPB and ZPB. As further example, the LTA system can be configured for lower altitude and/or smaller payload missions with a lighter weight system, for example with a single stage compressor and smaller volume SPB and ZPB. These and other features of the LTA systems described herein allow for performing advanced maneuvers at high altitude with a scalable platform. Thus, further described herein are associated methods of navigation and control with these LTA systems. The riser release systems and methods described herein may be used with any of these example LTA systems, or other systems, as mentioned.

In one aspect, a riser release system for controllably landing a descending flight vehicle is described. The flight vehicle has a payload suspended underneath a parafoil canopy. The riser release system comprises one or more control lines, one or more riser lines, and a release control device. The one or more control lines have a first end fixedly connected with the canopy and a second end fixedly connected with the payload. The one or more riser lines have a first end fixedly connected with the canopy and a second end releasably connected with the payload. The release control device is coupled with the second ends of the one or more riser lines and with the payload, and the release control device is configured to control a distance the second ends of the one or more riser lines travel from the payload after the second ends are released. The release of the second ends of the one or more riser lines allows the payload to drop away from the riser lines and increases a downward load from the payload on the one or more control lines, thereby causing the canopy to flare and a descent rate of the flight vehicle to decrease.

In some embodiments, the release control device may be further configured to control a rate at which the payload drops away from the second ends of the riser lines after the second ends of the riser lines are released.

The riser release system may further comprise a ground sensor configured to detect a distance from the flight vehicle to a landing surface below the vehicle. The second ends of the one or more riser lines may be configured to be released in response to the ground sensor detecting that the distance from the flight vehicle to the landing surface is within a threshold distance.

The release control device may be coupled with the second ends of the one or more riser lines via one or more parachute risers, and the release control device may be coupled with the payload via one or more payload risers.

The release control device may comprise a holder and a friction line. The friction line may have a first end connected to the riser line and a second end connected to the payload. A length of the friction line located between the first and second ends may be configured to wrap against the holder. Release of the one or more riser lines may cause the friction line to at least partially slide through the holder and payout from the friction device at a controlled rate due to friction between the friction line and the holder. The holder may be a cylinder and the friction line may be a friction rope wrapped at least partially around the cylinder.

The release control device may comprise a spring connecting the one or more riser lines to the payload. Release of the one or more riser lines may cause the spring to payout at a controlled rate. The spring may be a constant force spring.

The release control device may comprise a strap and a thread. The strap may have a first end and second end, with the first end coupled with the one or more riser lines, and the second end coupled with the payload. The thread may be coupled with the strap. The thread may be configured to rip at a controlled rate in response to a load applied to the thread via the strap that exceeds a threshold load, thus allowing the strap to release at a controlled rate. The first end of the strap may be coupled with the one or more risers via a riser leg, and the second end of the strap is coupled with the payload via a payload leg.

The riser release system may further comprise a releasable cord that releasably couples the second ends of the one or more riser lines together at a release point.

The one or more control lines may be configured to be releasably coupled with the one or more riser lines at a release point.

The ground sensor may comprise a light-emitting diode detection and ranging (LEDAR) system or a light detection and ranging (LIDAR) system.

The riser release system may further comprise an electronic controller in communicating connection with the ground sensor. The controller may be configured to automatically release the seconds ends of the one or more riser lines in response to the ground sensor detecting that the distance from the flight vehicle to the landing surface is within the threshold distance.

In another aspect, a riser release system for a flight vehicle having a payload and a canopy is described. The riser release system comprises a plurality of lines and a release control device. The plurality of lines is coupled with the canopy and the payload. The control device is coupled with one or more of the plurality of lines and with the payload and is configured to control a distance that the one or more of the plurality of lines travels after the one or more of the plurality of lines are released from the payload. The release of the one or more of the plurality of lines increases a downward load from the payload on one or more unreleased lines of the plurality of lines, thereby causing the canopy to flare and a descent rate of the flight vehicle to decrease.

In some embodiments, the riser release system further comprises a ground sensor configured to detect a distance from the flight vehicle to the surface below the flight vehicle, and the one or more of the plurality of lines are released in response to the distance being within a threshold distance.

The release control device may comprise a friction device, a constant force spring, or a rip stitch device.

In another aspect, a method for landing a flight vehicle having a payload coupled with a canopy via one or more control lines and one or more riser lines is described. The method comprises releasing the one or more riser lines a set distance from the payload, and flaring the canopy with the one or more control lines due to an increased load on the control lines from the payload caused by release of the riser lines.

In some embodiments, the method further comprises controlling a rate at which the one or more released riser lines travel the set distance. Releasing the one or more riser lines may comprise a) unwinding a friction line from a holder by pulling on the friction line with the one or more riser lines, b) extending a constant force spring by pulling on the spring with the one or more riser lines, or c) ripping a rip stitch thread from a strap by pulling on the strap with the one or more riser lines and thereby causing the strap to extend.

The method may further comprise determining a distance from the flight vehicle to the ground, and the one or more riser lines may be released in response to the distance from the flight vehicle to the ground being less than a threshold distance.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

FIGS. 15A and 15B are back and front views, respectively, of another embodiment of a riser release auto flare system that may be used with the various descent systems described herein.

FIGS. 16A and 16B are perspective views of an embodiment of a parafoil having the riser release auto flare system of FIGS. 15A and 15B and shown in, respectively, an unreleased and a released state.

FIGS. 16C and 16D are front and perspective views, respectively, of the riser release auto flare system of FIGS. 16A and 16B shown in an unreleased state.

DETAILED DESCRIPTION

Figure 1:
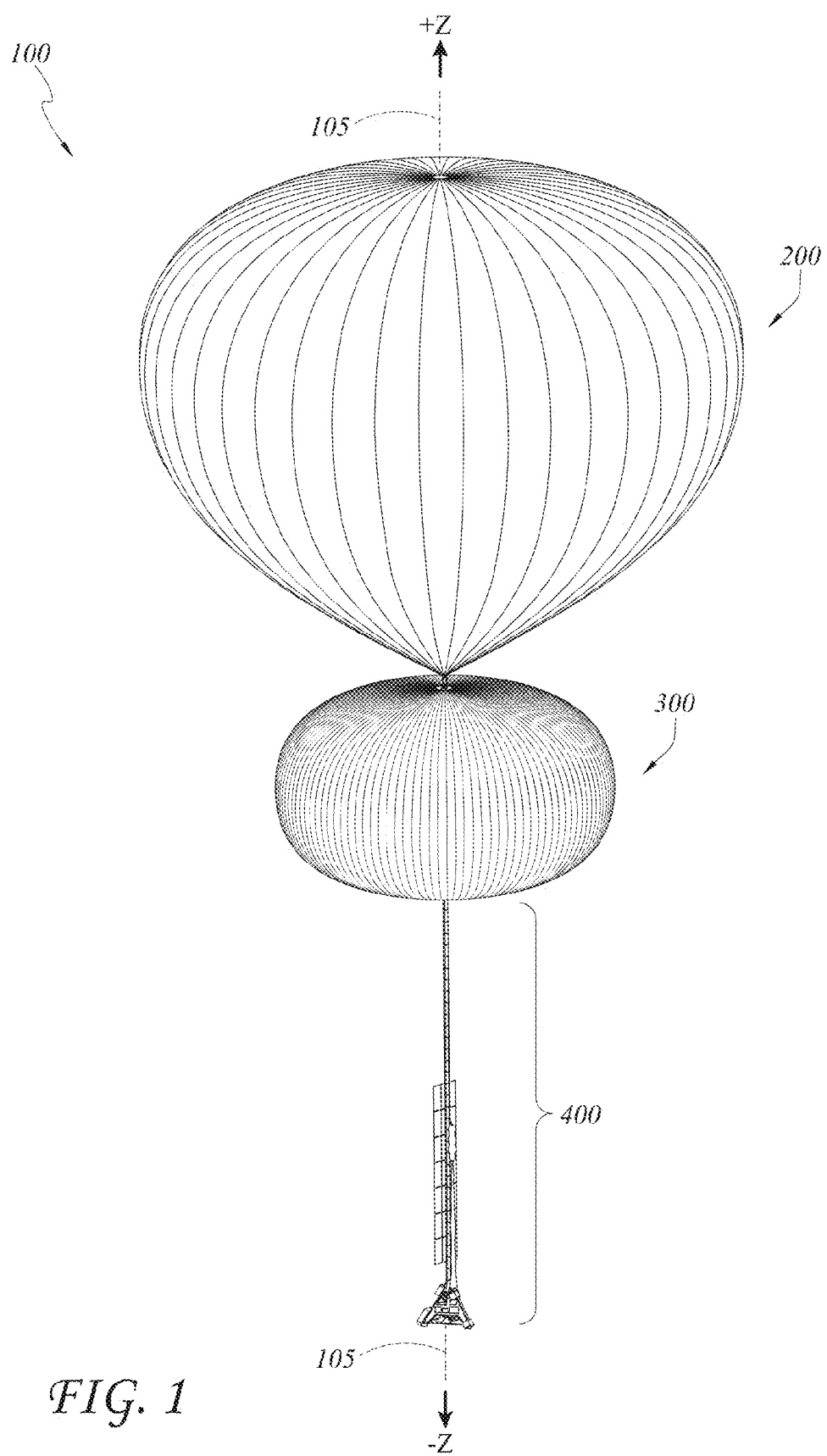
FIG. 1 is a perspective view of an embodiment of a lighter-than-air (LTA) system for high altitude flight including a zero-pressure balloon (ZPB), a super-pressure balloon (SPB) and a stratocraft having a payload, a parafoil descent system and supporting subsystems, that may incorporate the riser release systems described herein.

The following detailed description is directed to certain specific embodiments of the development. Reference in this specification to "one embodiment," "an embodiment," or "in some embodiments" means that a particular feature, structure, or characteristic described in connection with the embodiment is included in at least one embodiment of the invention. The appearances of the phrases "one embodiment," "an embodiment," or "in some embodiments" in various places in the specification are not necessarily all referring to the same embodiment, nor are separate or alternative embodiments necessarily mutually exclusive of other embodiments. Moreover, various features are described which may be exhibited by some embodiments and not by others. Similarly, various requirements are described which may be requirements for some embodiments but may not be requirements for other embodiments.

Various embodiments will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the development. Furthermore, embodiments of the development may include several novel features, no single one of which is solely responsible for its desirable attributes or which is essential to practicing the invention described herein.

In parachuting terms a "flare" is the action in which the control lines of the parafoil canopy are pulled down along the tail while the parafoil is flying. The pulling of these lines forces the tail of the parafoil canopy to deflect down, resulting in an increase in lift and drag on the canopy, slowing both the forward speed and downward speed of the system.

The riser release auto flare system described herein enables a descent system, such as a parafoil, to automatically flare the canopy and slow its descent and/or forward speed. Control lines may be connected to the tail of a canopy on one end and fixed to the payload on the other. Risers that connect to all the parachute/canopy lines (except for the control lines) can be released, allowing the payload to fall at a controlled rate and for a fixed distance beneath the parafoil and controllably pull the control lines down during that process to controllably flare the canopy.

Two mechanisms may be used in conjunction with the releasable risers. The first employs altitude or ground sensing equipment that can identify when the unit is nearing the ground so that it can initiate the riser release. The second is a device to control the rate at which the risers release.

The riser release system may be used with a variety of different flying vehicles. The riser release is described herein primarily with regard to lighter than air (LTA) systems for high altitude flight. However, the riser release system may be used with any other flying vehicle, high altitude or otherwise. In some embodiments, described herein are systems and devices for high altitude flight using LTA systems having tandem balloons. A zero-pressure balloon (ZPB) that provides lift is attached in tandem with one or more variable air ballast super-pressure balloons (SPB). The SPB provides a controlled and variable air ballast supply and emission (i.e. two-way ballast control) from ambient air in the surrounding atmosphere. A compressor, with sufficient air volume flow rate capabilities, provides sufficient ambient air to the SPB even at low densities in high altitudes for rapid descent or altitude maintenance. A controllable valve is sized and controlled for sufficient air release from the SPB for rapid ascent or altitude maintenance. These and other features of the LTA system allow for performance of advanced navigation and altitude control techniques. The LTA systems described herein are more agile, require less power and weigh less than existing balloon system solutions for similar mission requirements. The LTA system thus allows for performance of advanced maneuvers at high altitude, allowing for a multitude of high altitude LTA system uses—and with a single, scalable platform. Described herein are some embodiments of the LTA system and of some example methods of using the system, including rapid ascent/descent and station-keeping to maintain a persistence envelope at high altitudes. Thus, the LTA system has various other embodiments and is capable of many other uses, even if not explicitly described herein. A descent system may descend the payload from the vehicle, such as the balloon, and land the payload on the ground, and the riser release system may be employed with such descent system.

As used herein, "high altitude" refers to altitudes that are in the stratosphere (above 35,000 feet), and includes without limitation altitudes in the troposphere, the tropopause, and the stratosphere of Earth's atmosphere. The altitude range for "high altitude", for example in terms of kilometers or miles, will vary depending on the latitude and longitude. In some locations, high altitude will include a range of about 30,000 feet to about 120,000 feet or 130,000 feet. The exact altitude of flight desired depends on the wind distribution and the trajectory one is seeking. High altitude can also refer to altitudes of non-Earth atmospheres on other planets with atmospheres that may not fall within the given altitude range on Earth. Further, description herein of a system as "high altitude" is not meant to exclude flight of that system through lower altitudes, for example during takeoff from ground and ascent to higher altitudes or descent and landing on the ground.

A. LTA System

FIG. 1 is a perspective view of an embodiment of a lighter-than-air (LTA) system 100 for high altitude flight. The LTA system 100 may incorporate the riser release systems and methods described herein, for example those described with respect to FIGS. 8-16F. For reference, a longitudinal axis 105 is indicated. The longitudinal axis 105 is a reference axis for describing the system 100. Directions described as "outer," "outward," and the like, are referring to a direction at least partially away from such longitudinal axes, while directions described as "inner," "inward," and the like, are referring to a direction at least partially toward such longitudinal axes.

For reference, a +Z direction is indicated that is opposite in direction to that of gravity, and a −Z direction is indicated that is opposite in direction to the +Z direction. For the sake of description, directions described as "upper," "above," and the like, are referring to a direction at least partially in the +Z direction, and directions described as "lower," "below," and the like, are referring to a direction at least partially in the −Z direction. The +Z direction is the general direction the system 100 travels when ascending, while the −Z direction is the general direction the system 100 travels when descending. The direction of ascent and descent of the system 100 may not be aligned with, respectively, the +Z and −Z directions. For example, the system 100 may travel at an angle with respect to the +Z and −Z directions. Further, the longitudinal axis 105 may or may not align with the +/−Z directions and/or with the direction of travel of the system 100.

The LTA system 100 is shown in flight. Various features of the system 100 may change configuration, for example shape, geometry or dimensions, depending on the phase of a mission (e.g. takeoff, flight, landing). Thus, the depiction of the system 100 in any one configuration is not meant to limit the disclosure to that particular configuration. Further, the basic design of the LTA system 100 may be adapted, for example scaled, modularized, etc. for different mission requirements. The LTA system 100 can be modularized, for example with multiple SPB's 300 such as in tandem pneumatically connected to each other, as further described. The description herein is primarily of a very high altitude and/or heavy payload lifting version of the LTA system 100, unless otherwise stated. Therefore, other configurations, of the basic platform for the particular LTA system 100 described herein, are within the scope of this disclosure even if not explicitly described.

The LTA system 100 includes a zero-pressure balloon (ZPB) 200, a super-pressure balloon (SPB) 300 and a stratocraft 400. The ZPB 200, SPB 300 and the stratocraft 400 are shown coupled together. In some phases of flight, the ZPB 200, SPB 300 and the stratocraft 400 are not coupled together. For example, portions of the stratocraft 400 may release from the LTA system 100, such as during descent of a payload and descent system. As further example, the ZPB 200, SPB 300 and/or the stratocraft 400 may separate from each other after flight termination. The LTA system 100 may have a variety of other configurations. The LTA system 100 may have any of the configurations of any of the LTA systems described, for example, in U.S. Pat. No. 9,540,091, issued Jan. 10, 2017, and titled "High Altitude Balloon Systems and Methods," the entire contents of which are incorporated by reference herein in their entirety.

The ZPB 200 is a lifting balloon. The primary function of the ZPB 200 is to provide lift to the LTA system 100. A lighter-than-air (LTA) gas is provided inside the ZPB 200 in an amount at launch sufficient for the LTA system 100 to take off. The ZPB 200 will initially be under-inflated but with sufficient lifting capacity in a collapsed configuration at launch from ground, and will expand as the LTA system 100 ascends to higher altitudes with lower pressure air.

The ZPB 200 is a "zero-pressure" type of balloon. A "zero-pressure balloon" contains an LTA gas therein for providing lift to the LTA system 100. The ZPB 200 may be filled with helium or hydrogen. A "zero-pressure balloon" is normally open to the atmosphere via hanging or attached ducts to prevent over-pressurization. If flying alone as a single ZPB 200, the ZPB 200 would be susceptible to the cyclic increase and decrease in altitude caused by the constant balloon envelope volume change due to heating and cooling, and therefore expansion and contraction of the lift gas inside the ZPB 200 throughout the Earth's diurnal cycle. This constant altitude change leads to the loss of lift gas over time as the heating of the lift envelope during the day cycle causes the lift gas to expand until the maximum float altitude is reached and the LTA gas is vented out of the opening in the ZPB 200. During the night cycle, the lift gas contracts, causing the ZPB 200 envelop to contract and lose buoyancy. For this reason the LTA system 100 controls the natural changes of buoyancy as well having the ability to bias the buoyancy even more than simply neutralizing the natural changes in order to achieve controlled altitude changes. Particular embodiments and other aspects of the ZPB 200 are described in further detail herein, for example with respect to FIG. 2.

The ZPB 200 supports the SPB 300. As shown, the SPB 300 is supported underneath the ZPB 200. The ZPB 200 may support the SPB 300 either directly or indirectly, for example via a rotatable actuator, as described herein. In some embodiments, a rotatable connection between the ZPB 200 and SPB 300 may include a rotatable gimbal and related features, such as those described, for example, in U.S. Pat.

No. 9,540,091, issued Jan. 10, 2017, and titled "High Altitude Balloon Systems and Methods," the entire contents of which are incorporated by reference herein in their entirety.

The SPB 300 is a variable air ballast balloon. The primary function of the SPB 300 is to provide a variable amount of ballast to the LTA system 100. Ballast is taken into the SPB 300 in the form of compressed air to provide a greater downward force to the LTA system 100. Ballast is ejected from the SPB 300 to provide a smaller downward force to the LTA system 100. The ballast is provided from the ambient atmospheric air, for instance by a compressor, as described in further detail herein, for example with respect to FIGS. 5-7. To achieve neutral buoyancy the air ballast can be set at some fraction of the SPB 300 maximum pressure capability. This allows biasing in both a positive (greater air ballast) and negative direction (less air ballast) which leads to a descent speed or ascent speed respectively. In some embodiments, the LTA system 100 includes only one SPB 300. However, the LTA system 100 can include multiple SPB's 300 and/or one or more multi-chamber SPB's. The LTA system 100 may include any of the SPB configurations described, for example, in U.S. Pat. No. 9,540,091, issued Jan. 10, 2017, and titled "High Altitude Balloon Systems and Methods," and/or in U.S. Provisional Patent Application No. 62/443,945, filed Jan. 9, 2017, and titled "Continuous Multi-Chamber Super Pressure Pumpkin Balloons," the entire contents of each of which are incorporated by reference herein in their entirety The SPB 300 is a "super-pressure" type of balloon. A "super-pressure balloon" is completely enclosed and operates at a positive internal pressure in comparison to the external atmosphere. Pressure control enables regulating the mass of air in the SPB 300, and therefore the overall buoyancy of the LTA system 100. This buoyancy regulation enables altitude control of the LTA system 100. The SPB 300 may take in more air to apply more of a ballast force, for example to descend, or to compensate for an expanding ZPB 200 that is producing more lift, as described. Conversely, the SPB 300 may release air to apply less of a ballast force, for example to ascend, or to compensate for a contracting ZPB 200 that is producing less lift, as described. Particular embodiments and other aspects of the SPB 300 are described in further detail herein, for example with respect to FIGS. 3A-3B.

The SPB 300 supports the stratocraft 400. As shown, the stratocraft 400 is coupled with the SPB 300 beneath the SPB 300. The stratocraft 400 may be directly or indirectly connected with the SPB 300. In some embodiments, there are various intermediate structures and/or systems between the SPB 300 and the stratocraft 400, such as structural connectors, release mechanisms, other structures or systems, or combinations thereof.

The stratocraft 400 includes one or more systems related to various mission objectives. The stratocraft 400 may include the payload for a particular mission. The stratocraft 400 may include various subsystems, such as power, control, communications, air intake, air release, payload descent, etc., for supporting a mission. Particular embodiments of the stratocraft 400 are described in further detail herein, for example with respect to FIGS. 4A-4B. Some embodiments of particular payloads, supporting payload structures, air intake/release subsystems, and payload descent subsystems, are described in further detail herein, for example with respect to FIGS. 5-6.

B. Zero Pressure Balloon

Figure 2:
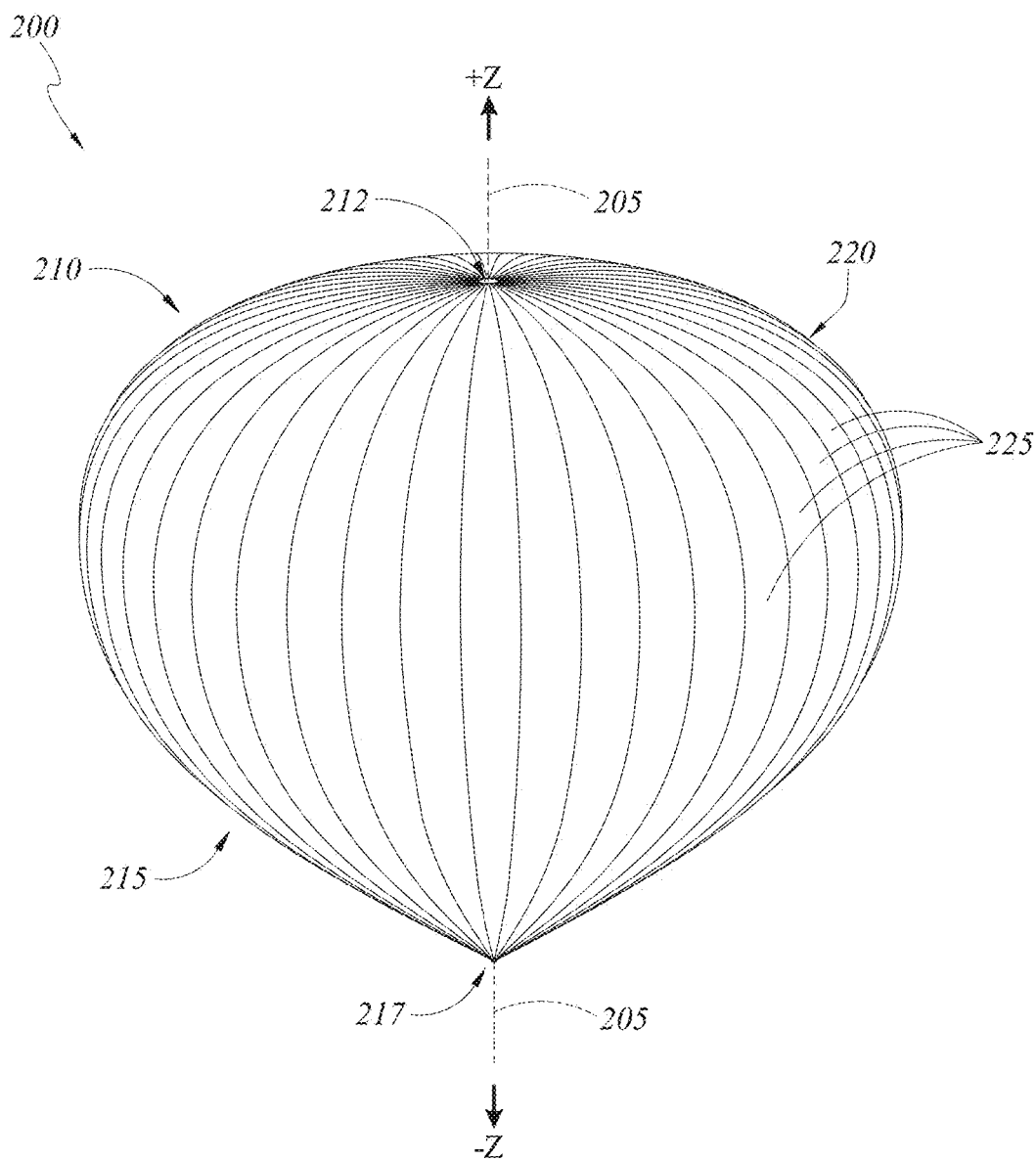
FIG. 2 is a perspective view of the ZPB of FIG. 1.

FIG. 2 is a perspective view of the ZPB 200. The ZPB 200 may be included with LTA systems that incorporate the riser release systems and methods described herein, for example those described with respect to FIGS. 8-16F. ZPB 200 provides a lift force in the +Z direction, as indicated. For reference, a geometric longitudinal axis 205 of the ZPB 200 is indicated. The longitudinal axis 205 may or may not align with the +Z direction, depending on the phase of flight, environmental conditions, etc. Further, the ZPB 200 may not cause the LTA system 100 to travel exactly in the +Z direction. Thus, while the lift force is in the +Z direction, the LTA system 100 may not travel in that same direction. In some embodiments, the LTA system 100 ascends in a direction that is at an angle to the +Z direction.

The ZPB 200 includes an upper portion 210 having a top 212 and a lower portion 215 having a bottom 217. The upper portion 210 refers to a part of the ZPB 200 that is above the lower portion 215. The upper and lower portions 210, 215 may be the upper and lower halves of the ZPB 200. The upper and lower portions 210, 212 may be symmetric about the longitudinal axis 205, for example when the ZPB 200 is fully inflated at its maximum volume altitude, such as in higher altitudes with less dense surrounding atmosphere. The dimensions of the ZPB 200 when upright and fully inflated may be about 100 feet wide and about 95 feet high. The ZPB 200 may have a range of widths from about 75 feet or less to about 370 feet or more. The ZPB 200 may have a range of heights from about 70 feet or less to about 310 feet or more.

The ZPB 200 includes a skin 220. The skin 220 forms the upper and lower portions 210, 215 of the ZPB 200, or sections thereof. The skin 220 is assembled to form the outer body of the ZPB 200. The skin 220 may be about 0.0008 inches thick. Various versions of the ZPB 200 may have a range of thicknesses of the skin 220 from about 0.00025 inches or less to about 0.0015 inches or more thick. The skin 220 may have a generally uniform thickness over most or all of the ZPB 200. In some embodiments, the thickness of the skin 220 may vary depending on the location of the skin 220 about the ZPB 200. The basic skin is known as the "shell", and if extra thickness is required for structurally containing the lift bubble at launch, those extra layers are known as "caps". Caps are usually some fraction of the gore length covering the top of the shell and usually are no longer than 50% of the gore length, although this changes depending on the design altitude.

The skin 220 defines one or more interior compartments of the ZPB 220 for receiving an LTA. In some embodiments, the ZPB 200 is configured to receive therein an LTA gas to provide an upward lifting force to the LTA system 100. The ZPB 200 may include about 500,000 cubic feet of maximum internal volume. Various versions of the ZPB 200 may include a range from about 250,000 cubic feet or less to about 30,000,000 cubic feet or more of maximum internal volume. The ZPB 200 may include sufficient lift gas to lift the gross weight of the vehicle plus additional "free lift" which can range from 5% of the gross weight to about 25% of the gross weight depending on the application. The volume of the launch "bubble" is a fraction of the maximum design volume and usually ranges from $\frac{1}{20}$ to $\frac{1}{200}$ of design volume depending on design altitude.

The skin 220 may be formed from a variety of materials. In some embodiments, the skin 220 is formed from plastic, polymer, thin films, other materials, or combinations thereof. The skin 220 may be made from multiple components. As shown, the skin 220 includes gores 225. The skin 220 may be configured with gores 225, other suitable approaches, or combinations thereof. The gores 225 are elongated sections of balloon material. The gores 225 may extend to the top 212 and/or to the bottom 217. In some embodiments, the gores 225 do not extend to the top 212 and/or to the bottom 217. For example, the skin 220 may be formed of gores 225, with endcaps surrounding upper and lower ends of the gores 225 at the top 212 and/or bottom 217. In some embodiments, the bottom 217 of the ZPB 200 is open and the lower ends of the gores 225 extend to or near the opening formed at the bottom 217.

The ZPB 200 changes configuration (shape, size, etc.) during flight as the lift gas volume expands and contracts. The skin 220 or portions thereof may change configuration due to launch requirements, variable air pressure, changes in volume of LTA, release of payload and descent systems, flight termination, etc.

C. Super Pressure Balloon

Figure 3A:
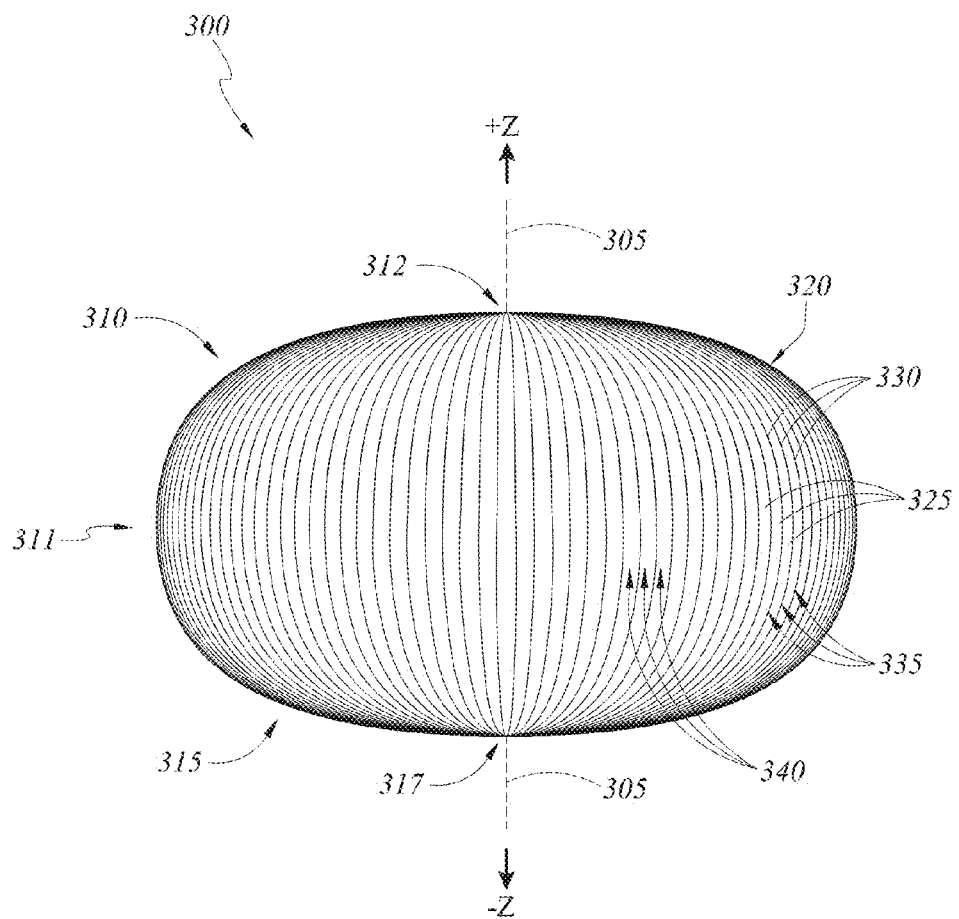
FIGS. 3A and 3B are, respectively, side and top views of the SPB of FIG. 1.
Figure 3B:
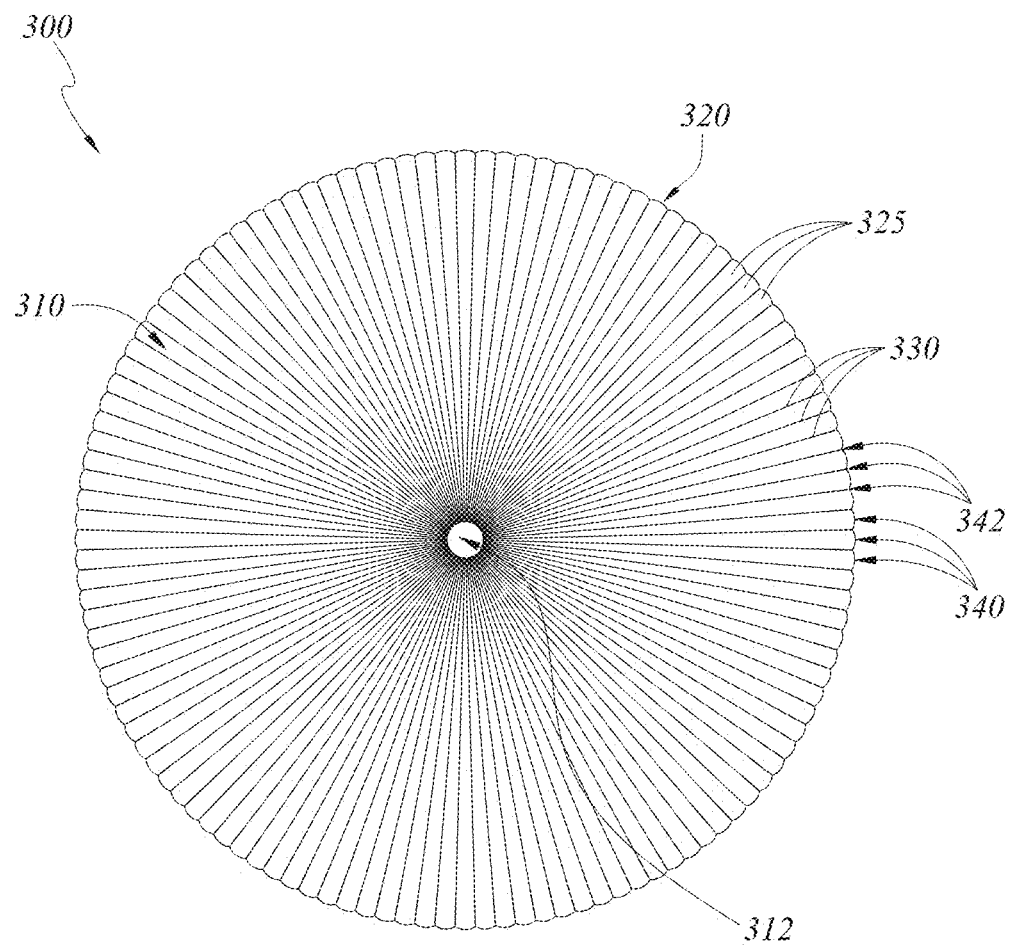

FIGS. 3A and 3B are, respectively, side and top views of the SPB 300. The SPB 300 may be included with LTA systems that incorporate the riser release systems and methods described herein, for example those described with respect to FIGS. 8-16F. The SPB 300 provides a downward ballast force in the −Z direction, as indicated. For reference, a geometric longitudinal axis 305 of the SPB 300 is indicated. The longitudinal axis 305 may or may not align with the −Z direction, depending on the phase of flight, environmental conditions, etc. Further, the SPB 300 may not cause the LTA system 100 to travel exactly in the −Z direction. Thus, while the downward force is in the −Z direction, the LTA system 100 may not travel in that same direction. In some embodiments, the LTA system 100 descends in a direction that is at an angle to the −Z direction, which may be mostly due to wind. In some embodiments, the force due to lift from the ZPB 200 is greater than the combined downward force due to gravity exerted by the entire LTA system 100, including the weight of the ZPB 200, the weight of the SPB 300, the weight of the stratocraft 400, etc. such that the LTA system 100 ascends in a direction that is at least partially in the +Z direction. In some embodiments, the force due to lift from the ZPB 200 is less than the combined downward force due to gravity exerted by the entire LTA system 100, including the weight of the ZPB 200, the weight of the SPB 300, the weight of the stratocraft 400, etc. such that the LTA system 100 descends in a direction that is at least partially in the −Z direction.

The SPB 300 includes an upper portion 310 having a top 312 and a lower portion 315 having a bottom 317. The upper portion 310 refers to a part of the SPB 300 that is above the lower portion 315. The upper and lower portions 310, 315 may be the upper and lower halves of the SPB 300. The upper and lower portions 310, 312 may not be separate parts, but may be portions of the same continuous skin of the SPB 300 used for description herein. The upper and lower portions 310, 312 may be symmetric about the longitudinal axis 305, for example when the SPB 300 is fully inflated when pressurized, which may be in higher altitudes with less dense atmosphere. The axis 305 of the SPB 300 may align with and/or be parallel to the axis 205 of the ZPB 200. In some embodiments, the axis 305 of the SPB 300 may not align with and/or not be parallel to the axis 205 of the ZPB 200. In some embodiments, the axis 305 of the SPB 300 may align with and/or be parallel to the axis 205 of the ZPB 200 during some phases of a flight, and the axis 305 of the SPB 300 may not align with and/or not be parallel to the axis 205 of the ZPB 200 during other phases of a flight.

The maximum dimensions of the SPB 300, for example when fully inflated, may be about 56 feet wide in diameter and about 35 feet long in height. The SPB 300 may have a range of maximum diameters from about 10 feet or less to about 500 feet or more. The SPB 300 may have a range of maximum lengths from about 5 feet or less to about 300 feet or more.

The SPB 300 includes a skin 320. The skin 320 forms the upper and lower portions 310, 315 of the SPB 300, or sections thereof. The skin 320 is assembled to form the outer body of the SPB 300. The skin 320 may be about 0.004 inches thick. Various versions of the SPB 300 may have a range of thicknesses of the skin 220 from about 0.0015 inches to about 0.008 inches thick. The skin 320 has a generally uniform thickness over most or all of the SPB 300. In some embodiments, the thickness of the skin 320 may not be uniform and may vary depending on the location of the skin 320 about the SPB 300.

The skin 320 defines one or more interior compartments of the SPB 300 for receiving and storing ambient air. In some embodiments, the outer skin 320 defines an interior volume of the SPB 300 configured to receive therein a variable amount of ambient air from a surrounding atmosphere to provide a variable downward force to the LTA system 100. The SPB 300 may have a maximum internal volume of about 64,000 cubic feet. Various versions of the SPB 300 may include a range from about 32,000 cubic feet or less to about 90,000 cubic feet or more of maximum internal volume.

The skin 320 may be formed from a variety of materials. In some embodiments, the skin 320 is formed from plastic, polymer, thin films, other materials, or combinations thereof. The skin 320 may be made from multiple components. As shown, the skin 320 includes gores 325. The skin 320 may be configured with gores 325, other suitable approaches, or combinations thereof. The gores 325 are elongated sections of balloon material. The gores 325 may extend to the top 312 and/or to the bottom 217. In some embodiments, the gores 325 do not extend to the top 312 and/or to the bottom 317. For example, the skin 320 may be formed of gores 325, with endcaps surrounding upper and lower ends of the gores 325 at the top 312 and bottom 317.

The SPB 300 includes multiple tendons 330. The tendons 330 are elongated flexible members. The tendons 330 may be axially-stiff, transverse-flexible rope-like members. The tendons 330 may be formed of fiber, composites, plastic, polymer, metals, other materials, or combinations thereof. The tendons 330 may have a denier of about 61,000. The tendons 330 may have range of deniers from about 10,000 to about 200,000. The tendons 330 may have a thickness of about 0.125 inch. The tendons 330 may have a thickness of 0.125 inch. The tendons 330 may have range of thicknesses from about 0.05 inches or less to about 0.5 inches or more. The tendons 330 may include covers or sheaths, either partially or entirely. The tendons 330 extend along the outside of the skin 320. The tendons 330 may extend from or near the top 312 to or near the bottom 317 of the SPB 300. The tendons 330 are meridonially configured, extending meridonially along the SPB 300. The tendons 330 may be separate from each other. In some embodiments, some or all of the tendons 330 may be coupled together. In some embodiments, some or all of the tendons 330 may form one continuous, long tendon. In some embodiments, the LTA system 100 includes a plurality of the tendons 330 coupled with the SPB 300 and extending along an exterior of the outer skin 320 of the SPB 300 and configured to bias the SPB 300 into a pumpkin-like shape at least when the SPB 300 is pressurized relative to the surrounding atmosphere, for instance when a first pressure inside the SPB 300 is greater than a second pressure of the surrounding atmosphere.

The SPB 300 may include tape 335. The tape 335 may be an adhesive material. The tape 335 may couple sections of the skin 320, such as the gores 325, together. The tape 335 may extend along edges of the gores 325. The tape 325 may extend underneath or generally near the tendons 330. In some embodiments, a segment of tape 325 extends underneath a corresponding segment of tendon 335. The tape 335 may extend to or near the top 312 and/or to or near the bottom 317 of the SPB 300.

The SPB 300 changes configuration (shape, size, etc.) during flight. The skin 320, tendons 330, and/or tape 335, or portions thereof, may change configuration due to launch requirements, variable air pressure, changes in volume of LTA, release of payload and descent systems, flight termination, pressurization with a compressor, etc. In some embodiments, the SPB 300 may be configured to take a particular shape during flight, such as a "pumpkin" shape or other shapes, as described herein.

The SPB 300 is shown with bulges 340. The bulges 340 are portions of the skin 320 that are located farther outward than adjacent portions of the skin 320. For example, the bulges 340 may be curved portions of the gores 325 that are located farther radially from the longitudinal axis 305 than adjacent portions of longitudinal edges of the gores 325. The bulges 340 may refer to portions of the skin 320 that are located farther outward than adjacent tendons 330 and/or tape 335. The bulges 340 may assist with forming part of the pumpkin shape of the SPB 300. This is a natural structural result of pressurizing the film while in a meridionally-reinforced multi-gore configuration.

The SPB 300 may be configured based on maximization of a performance ratio R defined by $R=[\Delta P \times V]/M$. Here, "$\Delta P$" is the differential pressure between the internal pressure of the SPB 300 and the ambient pressure of the immediately surrounding atmosphere, "V" is the maximum internal volume of the SPB 300 when assuming an inflated shape, and "M" is the gross mass of the LTA system 100 structure (e.g. the total mass of the ZPB 200, the SPB 300, the stratocraft 400, and other structural features of the LTA system 100, but not including the mass of any internal air or lift gas in the various balloons). In some embodiments, $\Delta P$ is about 3500 Pa. In some embodiments, $\Delta P$ is 3500 Pa, 5000 Pa, 7500 Pa, 10,000 Pa, or 12,000 Pa. Depending on the embodiment, $\Delta P$ may be within a range from about 750 Pa or less to about 12,000 Pa or more. In some embodiments, V is as described above regarding the internal volume of the SPB 300. In some embodiments, M is about 600 kilograms. Depending on the embodiment, M may be within a range from about 125 kilograms or less to about 2,000 kilograms or more.

The performance ratio R may be maximized with various configurations of the system 100. For example, the "Pumpkin" configuration of the SPB 300, as further described herein, allows for a large "$\Delta P$" and "V" with a smaller "M," which increases the ratio "R." As further example, an efficient intake and release of air allows for quickly filling the large "V" to perform the advanced maneuvers and missions. Features for achieving such efficient intake and release of air are described in further detail herein, for example with respect to FIGS. 5-7.

The SPB 300 may be in a "pumpkin" shape. The pumpkin shape may include the multiple bulges 340, a flattened top 312, a flattened bottom 317, and/or non-circular lateral cross-sections of the skin 320 (i.e. cross-sections of the skin 320 taken along a plane that includes the longitudinal axis 350). The skin 320 and accessories such as the tendons 330, tape 335, etc. may be designed to achieve the pumpkin configuration.

The SPB 300 may be designed to withstand large internal pressures while also providing structural stability at such large pressures. As further discussed herein, larger internal pressures of the SPB 300 allow for performing advanced maneuvers and achieving advanced mission goals with the system 100. However, large internal pressures of the SPB 300 may cause problems with structural integrity, stability, etc. For instance, "S-clefting" is a serious global geometric shape instability to which pumpkin-shaped balloons are susceptible. S-clefting can result in the skin 320 locally buckling and bunching together along a continuous curve from top to bottom, resulting in the general shape of an "S" on the balloon's surface. S-clefting may be caused by an excess of skin 320 material in the equatorial region, for example in the middle portion 311. The pumpkin shape may contribute to such concentration of material, for instance by having a well-rounded bulge-lobe angle. To imagine what is meant by bulge angle, consider a circle. Draw a line from a point on the circle to the center, then back out to another point on the circle not too far away from the first point. The angle of the "V" that was just drawn is the bulge angle, and the arc between the two points represents the shape of the gore bulge, or lobe. The reason to have the well-rounded bulge 340 (small bulge radii) is that it lowers the hoop stress in the skin 320 which allows for higher differential pressures in the SPB 300 without reaching the burst point. For instance, the pressure loads may be more efficiently transferred to the tendons 330, which may extend along the valleys 342 between the bulges 340. This beneficial stress-lowering effect however has a limit where too much material leads to the s-cleft instability.

The S-cleft depends in part on the number of gores 325 and the flatness of the bulges 340. "Flat" here refers to a smaller radial distance between the outermost and innermost portions of a given bulge 340 (smaller bulge angle). Flatter bulges 340 reduce the concentration of material around the balloon's middle portion 311 thus reducing the S-cleft susceptibility, but they also increase the hoop stress thus reducing the internal pressure capability. Further, a greater number of gores 325 reduces the load per tendon, but increases the S-cleft susceptibility. Thus, the number of gores 325, the flatness of the bulges 340, and the overall "pumpkin" shape are configured so the SPB 300 can withstand a high internal pressure while preventing structural instabilities such as S-clefting. The skin thickness, the design differential pressure, the arc angle of the gore bulges ("bulge angle"), strength and stiffness of the tendons, and the number of gores (and therefore number of tendons) have to be carefully balanced in the design process to not exceed the strength of the structural elements and to not have global shape instabilities called "s-clefts".

D. Stratocraft

Figure 4A:
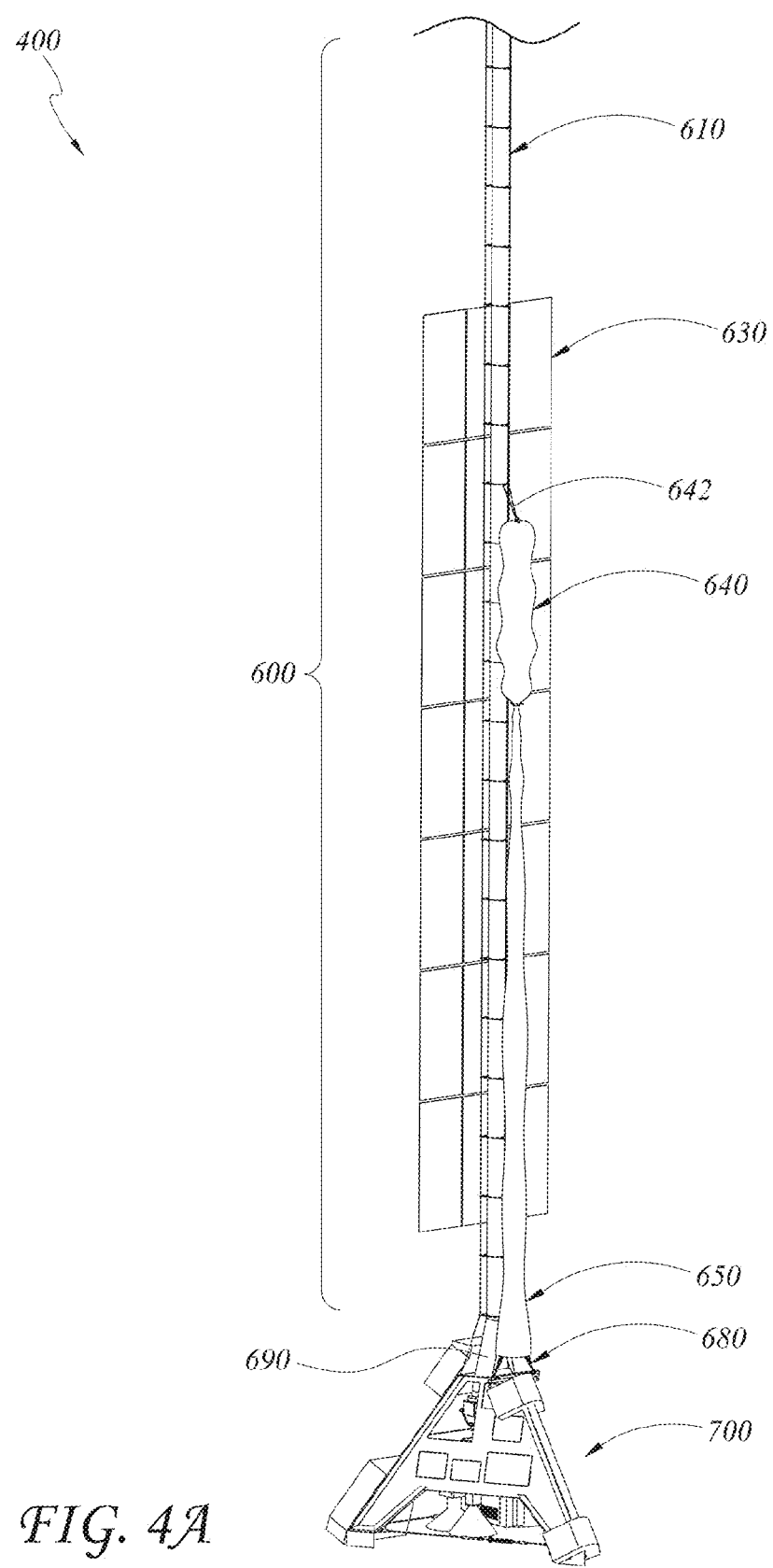
FIGS. 4A and 4B are, respectively, perspective and side views of the stratocraft of FIG. 1 including embodiments of an upper craft having a stowed parafoil and a payload support.
Figure 4B:
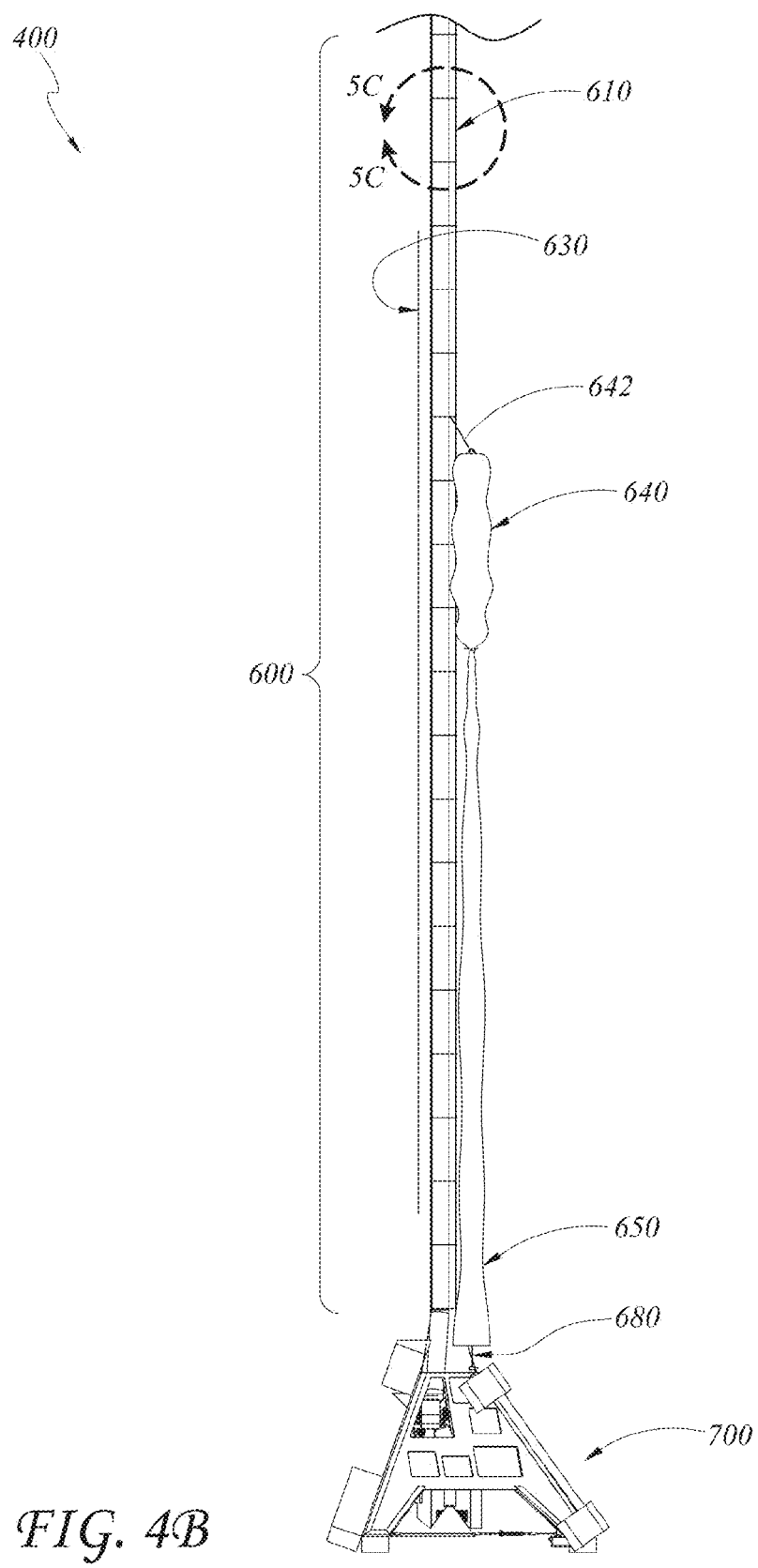

FIGS. 4A and 4B are, respectively, perspective and side views of an embodiment of the stratocraft 400. The stratocraft 400 includes various features for supporting mission objectives of the system 100, such as a payload and supporting subsystems. The stratocraft 400 includes embodiments of an upper craft 600 and a payload support 700. The upper craft 600 is coupled with the SPB 300. The upper craft 600 may be coupled with the bottom 317 of the SPB 300. The upper craft 600 may be rigidly coupled with the SPB 300. In some embodiments, the connection between the upper craft 600 and the SPB 300 may have the same or similar features and/or functionalities as the various connections between the SPB 300 and the ZPB 200. The stratocraft 400 may incorporate the riser release systems and methods described herein, for example with respect to FIGS. 8-16F.

The upper craft 600 includes a ladder assembly 610. The ladder assembly 610 is an elongated, structural connector that couples the payload support 700 with the SPB 300. The ladder assembly 610 may couple directly or indirectly with the SPB 300. The ladder assembly 610 may couple the payload support 700 with the SPB 300 such that the payload support 700 is located below the SPB 300 when the LTA system 100 is in flight. The ladder assembly 610 may be coupled with the SPB 300 such that rotation of the SPB 300 will rotate the ladder assembly 610. The ladder assembly 610 may couple with and/or support other features, as described herein. The ladder assembly 610 includes one or more wires for structurally supporting the payload support 700, as described in further detail herein, for example with respect to FIG. 4C. The ladder assembly 610 also includes an air hose 690, which is a conduit fluidly connecting the SPB 300 with the compressor assembly 800. In some embodiments, the ladder assembly 610 and the air hose 690 are the same components, although they may be separate components, as described herein. The ladder assembly 610 may have a length based at least in part on avoiding shading from the LTA system 100 during daylight, for example in order to provide sunlight to a solar array 630. Such shading may be due to the SPB 300 and/or ZPB 200 located above the stratocraft 400.

The stratocraft 400 includes the solar array 630. The solar array 630 may be part of the upper craft 600, as shown. The solar array 630 includes one or more solar panels configured to receive sunlight for conversion to electrical energy. The solar array 630 is generally planar. In some embodiments, the solar array 630 may be curved or otherwise flexible. A variety of suitable solar array 630 types may be used, including solar panels with cell efficiencies of about 23%, low cost per watt, without light-induced degradation, a low temperature coefficient, and/or having low light and broad spectral response. Solar panels of the solar array 630 also include features to address large temperature variations due to the very hot and very cold extremes of the high altitude environment The solar array 630 is coupled with the ladder assembly 610. The one or more solar panels of the solar array 630 may be located along the length of the ladder assembly 610. The solar array 630 may be directly or indirectly coupled with the ladder assembly 610. The solar array 630 is coupled with the ladder assembly 610 such that rotation of the ladder assembly 610 will rotate the solar array 630. The solar array 630 may be rotated to point at the sun for maximum solar energy conversion, as described herein. The solar array 630 rotates about the longitudinal axis 105 for azimuth adjustments. In some embodiments, the solar array 630 may rotate about multiple axes, for example, for azimuth and elevation adjustments.

The stratocraft 400 includes a bag 640. The bag 640 may be part of the upper craft 600. The bag 640 is used to contain features of a parafoil 680, such as a canopy 684, as described herein. The bag 640 may be a parachute bag or similar receptacle for containing the parafoil 680 features and allowing release therefrom. The bag 640 may be formed from a variety of materials, including fabric, other materials, or combinations thereof. The bag 640 is coupled with the ladder assembly 610. As shown, the bag 640 is connected to the ladder assembly 610 by a cord 642. The bag 640 may be directly attached to the ladder assembly 610. In some embodiments, the bag 640 may be releasably coupled with the ladder assembly 610.

The stratocraft 400 includes a cover 650. The cover 650 may be part of the upper craft 600. The cover 650 is used to contain features of a parafoil 680, as described herein. The cover 650 may be an elongated tube-like fabric for containing the parafoil 680 features and allowing release therefrom. The cover 650 may be formed from a variety of materials, including fabric, other materials, or combinations thereof. The cover 650 is coupled with the bag 640. The cover 650 may be directly attached to the bag 640. The cover 650 and bag 640 may be part of the same, continuous sleeve for housing various portions of the parafoil 680. For instance, the bag 640 may contain the bunched up canopy portion of the parafoil 680 while the cover 680 contains the lines of the parafoil. The cover 650 has an opening at the lower end for receiving the parafoil 680 inside the cover 650.

The stratocraft 400 includes the parafoil 680. The parafoil 680 may be part of the upper craft 600. The parafoil 680 is only partially shown in FIGS. 4A and 4B because it is stowed inside the cover 650 and bag 640. The parafoil 680 may be stowed during flight and then deploy to a deployed flight configuration, as described herein for example with respect to FIG. 6. The parafoil 680 may be coupled with the ladder assembly 610, for example, via the cover 650 and bag 640.

The parafoil 680 provides a descent system for the payload support 700. The parafoil 680 is initially coupled with the payload support 700 and restrained during flight. The parafoil 680 is then released from the upper craft 600, for example from the ladder assembly 610, the bag 640 and/or the cover 650, at high altitude and controllably descends to a landing site on the ground with the payload support 700. Upon release, the parafoil 680 may slide out of the bag 640 and cover 650 and deploy automatically. Some example embodiments of parafoil technology that may be used for the parafoil 680 are described, for example, in U.S. patent application Ser. No. 15/065,828, filed Mar. 9, 2016, titled Rigidized Assisted Opening System for High Altitude Parafoils, the entire disclosure of which is incorporated herein by reference for all purposes.

In some embodiments, the LTA system 100 includes a descent system in addition or alternative to the parafoil 680. For instance, the LTA system 100 may, in addition or alternative to the parafoil 680, include one or more parachutes, one or more drogue parachutes, other decelerators, or combinations thereof. The various descent systems may have some or all of the same or similar features and/or functionalities as described herein with respect to the parafoil 680. Thus, the various descent systems that may be incorporated in the LTA system 100 may have one or more release mechanisms, etc. In some embodiments, the LTA system 100 includes one or more of the descent systems described, for example, in U.S. patent application Ser. No. 14/188,581, filed Feb. 24, 2014, and titled NEAR-SPACE OPERATIONS, the entire disclosure of which is incorporated by reference herein for all purposes. In some embodiments, the LTA system 100 does not include any descent system.

The stratocraft 400 includes the air hose 690. The air hose 690 may be part of the upper craft 600 and/or the payload support 700. The air hose 690 is a hollow conduit providing for the movement of air therein. An inner cavity thus extends along at least a portion of the ladder assembly 610 through the air hose 690. In some embodiments, the ladder assembly 610 is hollow from the upper end to the lower end. The air hose 690 is formed from a generally flexible material, although in some embodiments it may be partially or entirely rigid. The air hose 690 may be formed from a variety of suitable materials, including fabrics, fibers, metals, composites, other materials, or combinations thereof. The air hose 690 may be connected to the SPB 300, for example the bottom 317, in a variety of suitable manners, including directly attached with fasteners, indirectly attached with brackets, etc. The air hose 690 may be releasably coupled with the payload support 700, such that release of the payload support 700 from the upper craft 600 allows for release of the air hose 690 from the payload support 700.

The air hose 690 fluidly connects the SPB 300 with features for air intake and release at or near the payload support 700. Ambient air from the surrounding atmosphere may therefore be received at or near the payload support 700 and transmitted via the air hose 690 to the SPB 300. The air hose 690 may be fluidly coupled with a compressor 810, where the compressor 810 is mounted with a payload support 700 and the compressor 810 is fluidly coupled with the interior volume of the SPB 300 via the air hose 690. The compressor 810 may be the compressor described, for example, in U.S. Pat. No. 9,540,091, issued Jan. 10, 2017, and titled "High Altitude Balloon Systems and Methods," the entire contents of which are incorporated by reference herein in their entirety. Air from inside the SPB 300 may be released through the air hose 690 back to the surrounding atmosphere.

Figure 4C:
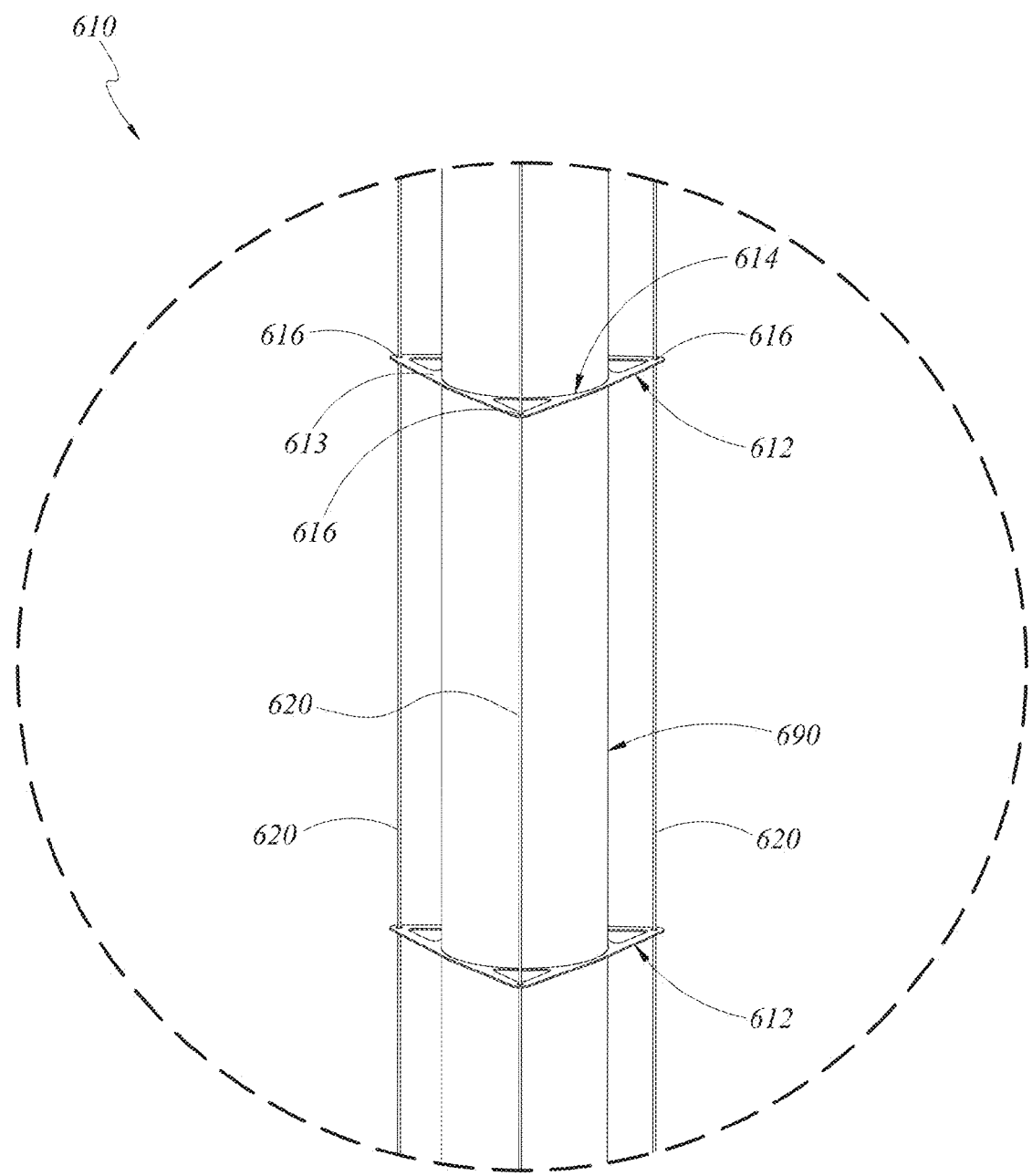
FIG. 4C is a close up view of a portion of a ladder assembly configured to couple the payload support with the SPB such that the payload support is located below the SPB when the balloon system is in flight.

FIG. 4C is a close up view of a portion of the ladder assembly 610. The ladder assembly 610 includes one or more rungs 612. There are two rungs 612 visible in the figure. The ladder assembly 610 may include five, ten, twenty, thirty, fifty, one hundred, or other lesser, in between or greater amounts of rungs 612. The rungs 612 are structural supports located along the length of the ladder assembly 610. The rungs 612 may be generally evenly spaced along the length of the ladder assembly 610 from the payload support 700 to the SPB 300.

The rungs 612 include a body 613. The body 613 may be formed from a variety of suitable materials, including metals, composites, plastics, other suitable materials, or combinations thereof. The body 613 may be partially or entirely rigid, or partially or entirely flexible. The body 613 forms a generally triangular shape. In some embodiments, the body 613 may form a variety of shapes, including rounded, circular, square, rectangular, other polygonal shapes, other suitable shapes, or combinations thereof. The body 613 is generally flat.

The body 613 of each rung 612 forms an opening 614 generally though the center of the rung 612, The opening 614 is configured, for example sized, to receive therein the air hose 690. The air hose 690 extends through the series of rungs 612 through the openings 614. The openings 614 may be sized to provide for an interference fit with the air hose 690. The openings 614 may be sized to provide for a loose with the air hose 690. air hose 690 extends along the length of the ladder assembly 610. The ladder assembly 610 may at least partially support the air hose 690, for example via the rungs 612. In some embodiments, the air hose 690 is supported at various locations along the ladder assembly 610 by the rungs 612. In some embodiments, the air hose 690 may extend partially or completely along the outside of the ladder assembly 610.

The rungs 612 include one or more guide openings 616. As shown, each rung 612 includes three guide openings 616. The guide openings 616 are located at or near the edges of the body 613. As shown, the guide openings 616 are located at the vertices of the triangular-shaped rungs 612. The guide openings 616 define spaces configured to receive therein a ladder rope 620.

The ladder assembly 610 includes one or more ladder ropes 620. As shown in FIG. 4C, the ladder assembly 610 includes three ladder ropes 620. In some embodiments, the ladder assembly 610 may include less than or more than three ladder ropes 620. The ladder ropes 620 are structural connectors that connect the payload support 700 with the SPB 300. The ladder ropes 620 may be formed from a variety of suitable materials, including composites, fibers, metals, plastics, other suitable materials, or combinations thereof. The ladder ropes 620 may secure the rungs 612 in place. For example, clips, knots, or other features of the ladder ropes 620 may be incorporated at desired spacings to secure the rungs 612 at corresponding desired spacings. The ladder ropes 620 may be releasably connected with the payload support 700, as described herein. The ladder ropes 620 may couple with the SPB 300 directly or indirectly, for example via structural connectors located at the bottom 317 of the SPB 300, or otherwise with the lower portion of the SPB 300. In some embodiments, the ladder ropes 620 may extend all the way to the ZPB 200, for example for connection to the top of the gores 225 for goring the ZPB 200 upon flight termination, as described herein.

The rungs 612 may couple other features with the ladder assembly 610. The rungs 612 may connect the solar array 630, the cord 642, the bag 640, the cover 650, the parafoil 680, and/or other features with the ladder assembly 610.

E. Payload Support

Figure 5:
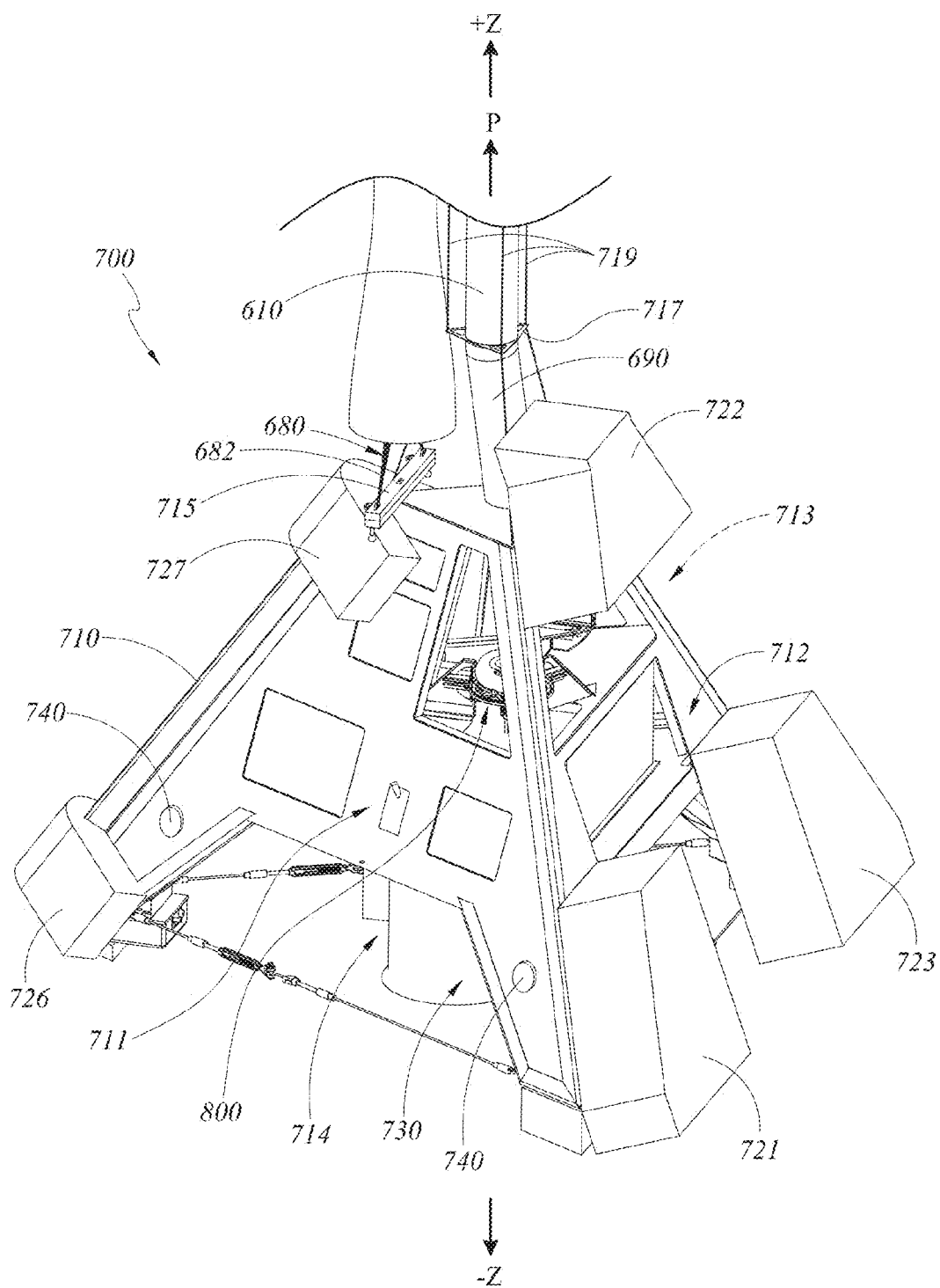
FIG. 5 is a top perspective view of the payload support of FIGS. 4A-4B including a compressor assembly.

FIG. 5 is a top perspective view of an embodiment of the payload support 700. The payload support 700 provides structural support to a payload 730 and other subsystems. The payload 730 may be a variety of different systems, including but not limited to instruments and passenger space capsules, as further described herein. Thus, while the particular embodiment shown is related to a particular payload 730 and payload support 700 with particular configurations, the disclosure is not limited to only these features and configurations. A variety of other payloads and support structures and configurations may be used with the system 100. For reference, a direction P is indicated. The direction P is a geometric reference direction that is "fixed" to the payload support 700 frame of reference, such that the direction P points in different directions as the payload support 700 rotates. The payload support 700 may incorporate the riser release systems and methods described herein, for example those described with respect to FIGS. 8-16F.

The payload support 700 includes a frame 710. The frame 710 is a rigid structure providing support and stability to various features of the system 100. The frame 100 may be formed from a variety of suitable materials, including metals, composites, other materials, or combinations thereof. The frame 710 may have a variety of configurations. As shown, the frame 710 is in the shape of a tetrahedron. The frame 710 thus has three side faces 711, 712, 713. Only side faces 711 and 712 are visible in FIG. 5, with side face 713 located on the backside of the payload support 700 as oriented in the figure. A lower face 714 is located on the lower end of the payload support 700 and partially in between the three side faces 711, 712, 713. The lower face 714 may be entirely or substantially open. The lower face 714 may include the payload 730, as described herein. The faces 711, 712, 713 may be planar as shown, or have other contours, and be located generally in between side members of the frame 710. The tetrahedral frame 710 forms an apex at the intersection of the frame 710 members that points in the direction P, which is away from the lower face 714. As shown, the direction P may align with the +Z direction. In some embodiments, the direction P may not align with the +Z direction. The frame 710 may be coupled with the riser release systems described herein, for example those described with respect to FIGS. 8-16F.

The payload support 700 is releasably coupled with the upper craft 600. The payload support 700 is attached during flight to the upper craft 600, such as to the ladder ropes 620. The payload support 700 is then released for descent back to ground with the parafoil 680 and payload 730.

The payload support 700 is coupled with the upper craft 600 via a flaring bracket 715, parafoil lines 682, and release lines 719. Upper ends of the release lines 719 are attached to the upper craft 600 and lower ends of the release lines 719 are releasably attached to the payload support 700. Upon release of the lower ends of the release lines 719 from the payload support 700, an increased downward force is then applied to the flaring bracket 715, due to the loss of support from the release lines 719, ultimately causing the flaring bracket 715 to separate from the payload support 700 and re-orient the payload support 700. In some embodiments, the flaring bracket 715 may be used with and/or part of the riser release systems and methods described herein, for example as described with respect to FIGS. 8-16F. In some embodiments, the flaring bracket 715, parafoil lines 682, and/or release lines 719 may be separate from the various lines and risers used with the riser release systems and methods described herein.

In some embodiments, the increased force due to release of the release lines 719 causes the payload support 700 along with the attached parafoil 680 to fall from the upper craft 600. The parafoil 680 thus slides out of the cover 650 and bag 640. After the parafoil 680 exits the cover 650 and bag 640, the parafoil 680 deploys into flight configuration. Upon deploying into flight configuration, a force due to deceleration is transmitted to the flaring bracket 715. The flaring bracket 715 is held down by a cord that breaks at a threshold force. The force due to deceleration exceeds this threshold force and breaks the cord, causing the flaring bracket 715 to separate from the payload support 700. The detachment or separation of the flaring bracket 715 thus causes the payload support 700 to re-orient, as described below.

In some embodiments, the increased force due to release of the release lines 719 alone causes the flaring bracket 715 to release. In this case, the flaring bracket 715 has separated before the payload support 700 has significantly fallen from the upper craft 600 and before the parafoil 682 has slid out of the cover 650. The flaring bracket 715 thus separates from the frame 710 as the payload support 700 falls away from the upper craft 600. As the payload support 700 falls away, the parafoil 680, which is attached to the payload support 700 via the parafoil lines 682, is pulled out of the cover 650 and bag 640. After the parafoil 680 exits the cover 650 and bag 640, the parafoil 680 deploys into flight configuration. Further, the parafoil lines 682 are attached at locations of the payload support 700 such that the payload support 700 re-orients upon release of the flaring bracket 715, as described below.

Lower ends of the parafoil lines 682 are connected at locations of the frame 710 such that the payload support 700 re-orients, e.g. rotates, upon release from the upper craft 600. In some embodiments, the parafoil lines 682 are connected with the lower face 714, such as with a supporting bracket of the lower face 714. As shown, the flaring bracket 715 is coupled with lines 682 of the parafoil 680. The release lines 719 also releasably couple the payload support 700 with the upper craft 600. As shown, three release lines 719 extend through a guide 717 and up along the ladder assembly 610. The release lines 719 may be released from the payload support 700.

The payload support 700 includes landing pads 721, 722, 723. The landing pads 721, 722, 723 are structural absorbers configured to absorb impact upon landing. As shown, there are three landing pads 721, 722, 723 located in corners of the first side face 712. In some embodiments, there may be less than or greater than three landing pads and/or in a variety of locations. The landing pads 721, 722, 723 may be crushable structures that collapse upon landing to attenuate forces due to landing, for example to protect the payload and other systems. The payload support 700 also includes bumpers 726, 727 on a frame 710 member located opposite the side face 712 and the landing pads 721, 722, 723. The bumpers 726, 727 provide extra protection for the frame 710, for example in the event of rollover upon landing.

The payload support 700 includes the payload 730. The payload 730 is coupled with the payload support 700, for example structurally attached. The payload 730 may be coupled with the payload support 700 so that it is dynamically and/or vibrationally isolated from the payload support 700 to attenuate force transmission from the payload support 700 to the payload 730. The payload 730 is located generally at or near the lower face 714 of the payload support 700. The payload 730 may therefore be facing toward ground while the system 100 is in flight. The payload 730 may be considered "nadir-pointing," for example the payload 730 may have a field of view that points generally toward the ground. The payload 730 may be or have a variety of suitable systems, sensors, computing capabilities, etc. In some embodiments, the payload 730 is an instrument, for example an optical instrument. In some embodiments, the payload 730 is a sensor or sensor suite, for example infrared, visual or thermal sensors. The payload 730 may be other types of systems, or combinations thereof. The payload 730 may weigh about 200 pounds. Depending on the embodiments, the payload 730 may be within a range of weights from about 30 pounds or less to about 500 pounds or more.

The LTA system 100 includes one or more sensors 740. As shown, the payload support 700 includes one or more sensors 740. The sensors 740 are coupled with the frame 710. The sensors 740 may be in a variety of different locations of the payload support 700. The sensors 740 may be located or otherwise associated with the payload 730, a compressor assembly 800, and/or other subsystems or components of the payload support 700. In some embodiments, one or more of the sensors 740 include ground sensors that detect the distance to the ground. Example ground sensors are further described herein, for example with respect to FIGS. 8-16F.

The sensors 740 are devices for detecting various parameters and providing a corresponding output indicative of those parameters. The sensors 740 may be coupled with the LTA system 100 and configured to detect an environmental parameter or attribute. The parameters detected may be related to various events, changes, properties, etc. Such parameters may be related to the LTA system 100 or components thereof, and/or to the surrounding environment (e.g. atmosphere). The sensors 740 may be a variety of different types of sensors. The sensors 740 may be pressure sensors (such as transducers) for detecting the ambient pressure, which may be used for, among other things, determining altitude. The sensors 740 may be temperature sensors for detecting ambient temperature, which may be used for among other things, determining air flow rates or intended pressures for the SPB 300. The sensors 740 may be accelerometers and/or gyroscopes, which may be used for among other things determining position, velocity and acceleration of the LTA system 100 or various components thereof. The sensors 740 may be sun sensors, which may be used for among other things pointing the solar array 630 toward the sun. These are just some examples, and the sensors 740 may be many other different types of sensors and based on many other sensing principles, including light sensors, infrared sensors, thermocouples, potentiometers, magnetic field sensors, gravitational sensors, humidity sensors, moisture sensors, vibration sensors, electrical field sensors, sound sensors, forces sensors, strain gages, piezoelectric sensors, resistive sensors, micro-electro-mechanical sensors (MEMS), ultrasonic sensors, humidity sensors, gas sensors, chemical sensors, flow sensors, other sensors, or combinations thereof.

Besides the payload support 700, the sensors 740 may in addition or alternatively be included with various other components of the LTA system 100, for example with the ZPB 200, the SPB 300, the gimbal 500, the upper craft 600, the solar array 630, the parafoil 680, the payload 730, the various release mechanisms, other features of the system 100, the riser release system, or combinations thereof. In some embodiments, one or more sensors 740 are located or otherwise associated with the ZPB 200 and/or the SPB 300. For example, the ZPB 200 and/or the SPB 300 may include pressure sensors for detecting internal pressures, flow sensors for detecting the flow of air into and/or out of the balloons, temperature sensors for detecting the temperature inside and/or outside of the balloons or of the balloon materials, accelerometers and/or gyroscopes for detecting the acceleration and/or velocity of the balloons, position sensors for detecting the positions of the balloons or of various components or portions of the balloons, etc.

The payload support 700 includes a compressor assembly 800. The compressor assembly 800 is coupled with the payload support 700. The compressor assembly 800 is shown mounted within the payload support 700. The compressor assembly 800 may be coupled with the payload support in a variety of suitable ways, including indirectly attached via brackets or other structures, directly attached to the frame 710, other suitable attachment means, or combinations thereof. The compressor assembly 800 provides for moving ambient air from the surrounding atmosphere into the SPB 300, and for moving air contained inside the SPB 300 back to the surrounding atmosphere, as described herein. The compressor assembly 800 is therefore fluidly coupled with ambient air in the surrounding atmosphere and fluidly coupled with the interior of the SPB 300. The compressor assembly 800 is coupled with the SPB 300 via the air hose 690. As shown, the air hose 690 extends upward from the compressor assembly 800 and through the ladder assembly 610. This is merely one of a number of suitable configurations. For instance, the air hose 690 may extend in different directions from the compressor assembly 800, may extend along the outside of the ladder assembly 610, etc. The compressor assembly 800 may be the compressor assembly and valve described, for example, in U.S. Pat. No. 9,540, 091, issued Jan. 10, 2017, and titled "High Altitude Balloon Systems and Methods," the entire contents of which are incorporated by reference herein in their entirety.

F. Descent System

Figure 6:
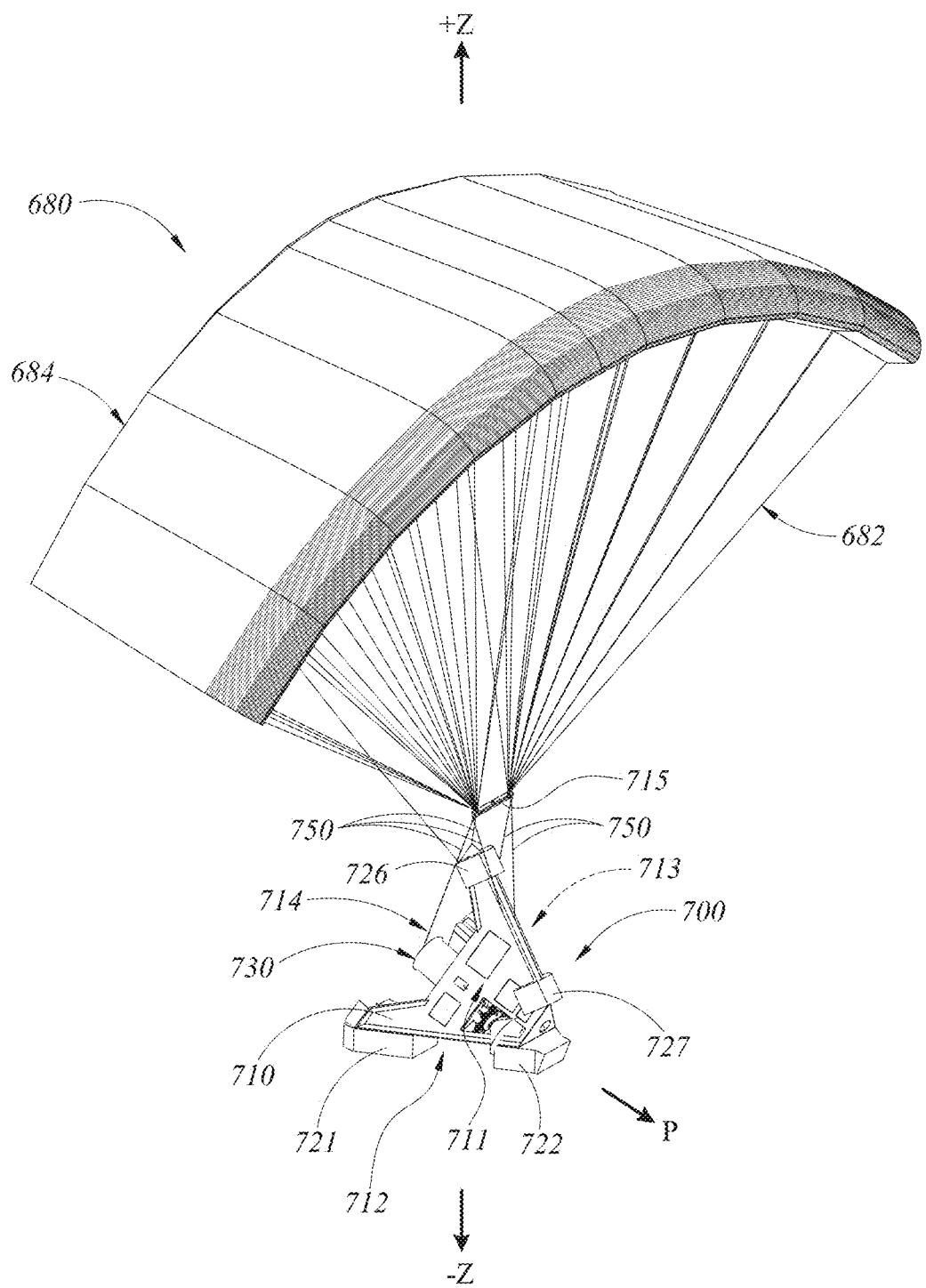
FIG. 6 is a perspective view of the parafoil system of FIGS. 4A and 4B separated from the LTA system and in a deployed flight configuration with the payload support.

FIG. 6 is a perspective view of the parafoil 680. The parafoil 680 is shown separated from the LTA system 100 and in a deployed flight configuration with the payload support 700. As described herein, the parafoil 680 separates from the upper craft 600 and deploys in the flight configuration to descend to ground with the payload support 700. In some embodiments, the parafoil 680 may be configured to deploy into the flight configuration before separating from the rest of the LTA system 100. Thus, the descriptions of particular configurations of the parafoil 680, and of particular deployment and flight procedures of the parafoil 680, are not meant to limit the scope of the LTA system 100 and related methods to only those particular configurations and procedures. In some embodiments, a descent system of the LTA system 100 may include, in addition or alternative to the payload 680, other descent components, including but not limited to parachutes, other canopy or fabric-type descent systems, and other suitable features. These and other descent systems may incorporate the riser release systems and methods described herein, for example those described with respect to FIGS. 8-16F.

As shown, the parafoil 680 includes a canopy 684. The canopy 684 is shown in the deployed, flight configuration. The canopy 684 is at least partially a soft structure that provides lift to the parafoil 680. The canopy 684 may have more rigid features, such as stiffeners, local attachments, etc. The deployed canopy 684 is generally shaped like a bent wing, with a cross-sectional geometry approximating an airfoil shape. The canopy 684 may have openings allowing for air to flow through and into the canopy 684. Such air flow may assist with achieving and/or maintaining the deployed shape of the canopy 684. The canopy 684 is capable of being stowed in a collapsed configuration and of deploying into the flight configuration. The stowed canopy 684 is stored within the bag 640 and/or within the cover 650 of the stratocraft 400. As discussed, the parafoil 680 may be released from the upper craft 600, for example from the bag 640 and/or cover 650. The canopy 684 may be released from the bag 640 and/or cover 650 upon deployment of the parafoil 680.

The parafoil 680 includes one or more lines 682. The lines 682 couple the canopy 684 with the payload support 700. As shown, there are multiple lines 682 attaching the canopy 684 to the flaring bracket 715 of the payload support 700. The flaring bracket 715 is shown in a detached configuration, where the flaring bracket 715 has detached from the payload support 700. The lines 682 may couple the flaring bracket 715 to various locations of the canopy 684, including the front, back, center, one or more sides, other locations, or combinations thereof, of the canopy 684. The lines 682 transmit a lifting force from the canopy 684 to the payload support 700. The lines 682 may be formed of a variety of suitable materials, including fiber, composite, metallic, other materials, or combinations thereof.

The lines 682 may be rigid or rigidized to assist with the deployment process of the parafoil 680. The lines 682 may extend through a rigid sleeve such as a composite tube, or have a rigid rod inserted into them in order to prevent entanglement during deployment and to assist in the opening of the canopy 684 at high altitudes where air densities are low. In some embodiments, some or all of the lines 682 may be rigidized. For example, some of the lines 682 may include relatively stiffer covers around the lines. Such stiff covers of the lines 682 may assist with deployment of the lines 682 and/or with mitigating or preventing entanglement of the lines 682. In some embodiments, the parafoil 680 includes one or more rigidized assist opening members. For example, the parafoil 680 may include flexible rods that connect the payload support 700 to the canopy 684. The flexible rods may store potential energy in a flexed, stowed state and use that energy to assist with releasing and deploying the canopy 684 into flight configuration. Such flexible rods may be in addition or alternatively to the stiffened lines 682. These are merely some examples of the multitude of configurations for parafoil 680. Further details of some of these and other configurations for the parafoil 680 are described, for example, in U.S. patent application Ser. No. 15/065,828, filed Mar. 9, 2016, titled Rigidized Assisted Opening System for High Altitude Parafoils, the entire disclosure of which is incorporated herein by reference for all purposes.

The parafoil 680 is shown in flight attached to the payload support 700. As mentioned, the LTA system 100 may re-orient the payload support 700 in flight relative to its orientation when coupled with the upper craft 600. The payload support 700 is thus shown in FIG. 6 re-oriented relative to the orientation shown in FIG. 5. In particular, in FIG. 6 the direction P is now at an angle with respect to the +Z direction. The payload support 700 has thus rotated about ninety degrees. The lower face 714 is no longer facing in the −Z direction. The side face 712 is now facing generally in the −Z direction. By not facing the lower face 714 in the −Z direction, the payload 730 which is generally located along the lower face 714 is further protected for landing. For instance, the payload support 700 will land on the −Z pointing side face 712 and not on the side-facing lower face 714. Thus, the lower face 714 can be used to point the payload 730 toward ground during flight but then rotate to land on a different face and protect the payload 730. Further, the landing pads 721, 722, 723 are now facing in the −Z direction and can thus absorb most or all of the impact upon landing. In addition, the bumpers 726, 727 provide for further protection, for example if the payload support 700 rolls over forward upon landing. The side face 713 is on the back of the payload support 700 as oriented, and is thus not visible. This is merely one example of the orientation that the payload support 700 may assume after being re-oriented, and other orientations may be implemented.

The payload support 700 may re-orient using one or more line extensions 750. The line extensions 750 are extensions of the parafoil lines 682. Some or all of the line extensions 750 may be separate lines coupled with the flaring bracket 715 and/or with the parafoil lines 682. Some or all of the line extensions 750 and corresponding parafoil lines 682 may be part of one, continuous line. The line extensions 750 are attached to the payload support 700 in particular locations to cause the payload support 700 to re-orient upon release from the upper craft 600. As shown, the line extensions 750 are coupled with frame 710, for example near the bumper 727, and generally in the P direction. Other line extensions 750 are coupled with the lower face 714, for example with the payload 730 or other components. The flaring bracket 715 is located generally above the bumper 726.

G. Control Systems and Controllers

Figures 7A, 7B:
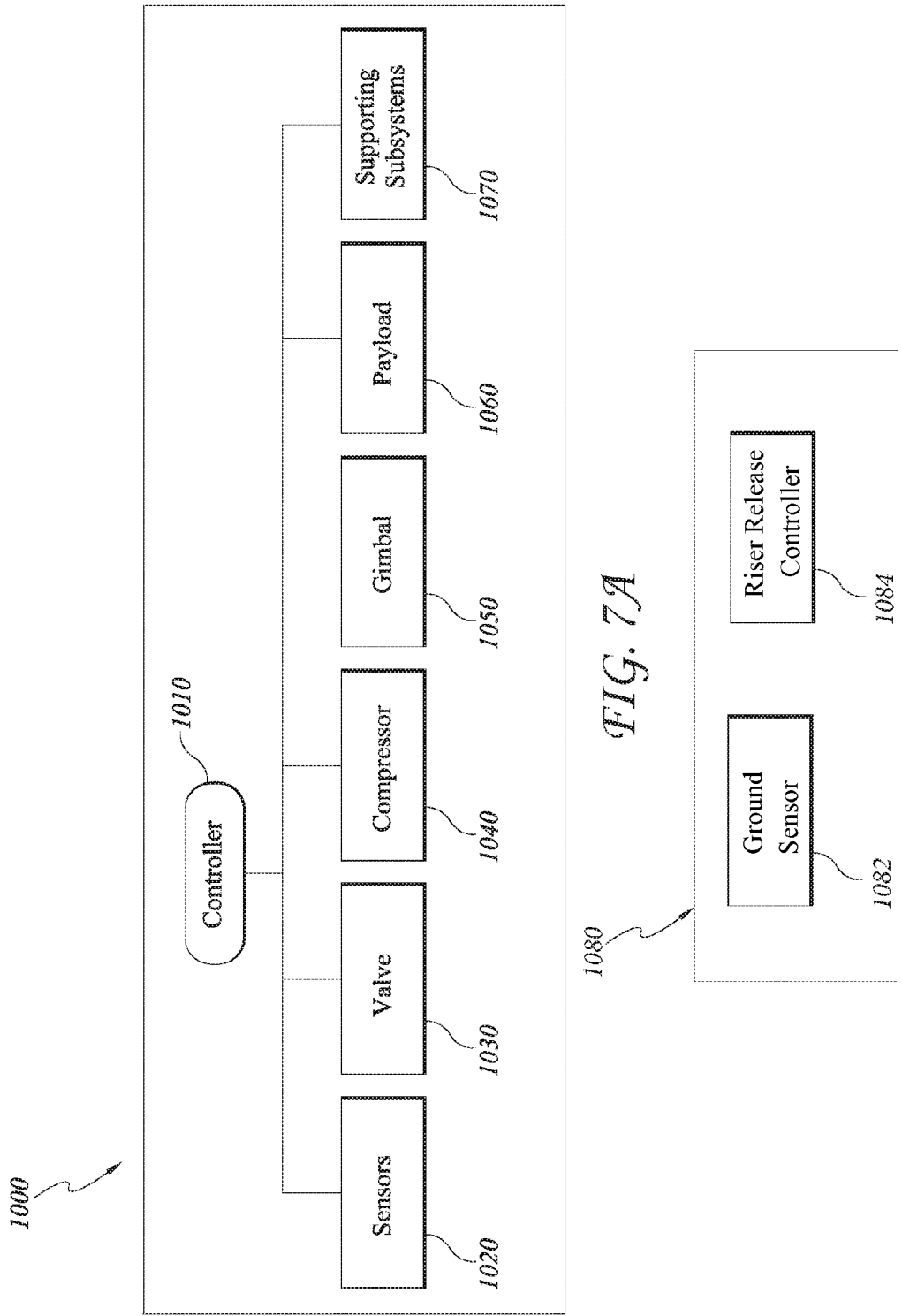
FIG. 7A is a schematic depicting an embodiment of a control system of the LTA system of FIG. 1 to control altitude and other parameters.
FIG. 7B is a schematic depicting an embodiment of a controller that may be used to control the riser release system described herein.

FIG. 7A is a schematic an embodiment of a control system 1000 that may be used with the various LTA systems described herein, for example the LTA system 100. In some embodiments, the control system 1000 is in communicating connection with the sensor 740, with the centrifugal compressor 810, and with the adjustable valve 740, and is configured to control the centrifugal compressor 810 and the adjustable valve 740 based at least on one or more detected environmental attributes to control the amount of ambient air inside the SPB 300 to control an altitude of the LTA system 100.

The control system 1000 includes a controller 1010 in communicating connection with various components. The communicating connections may be wired or wireless. The controller 1010 is an electronic controller. The controller 1010 is in communicating connection with one or more sensors 1020. The sensor 1020 may be the sensor 740 described herein. The sensor 1020 detects various parameters and provides corresponding output, for example data or information, that is communicated to the controller 1010. The controller 1010 receives the output from the sensor 1020 to determine various control operations.

The controller 1010 is in communicating connection with a valve 1030 and a compressor 1040. The valve 1030 and the compressor 1040 may be, respectively, the valve 870 and the compressor 810 described herein. The valve 1030 and compressor 1040 are shown as separate components. In some embodiments, the valve 1030 and compressor 1040 may be part of the same system, such as the compressor assembly 800 or part of a reversible compressor, as described herein. The controller 1010 controls the opening and closing of the valve 870 to cause more or less air to be released from the SPB 300. The controller 1010 controls the operation of the compressor 810 to cause more or less air to be provided to the SPB 300, for example by running the compressor at higher or lower speeds.

The controller 1010 may control the operation of the valve 1030 and/or compressor 1040 based on output of the one or more sensors 1020, and/or based on commands sent to the controller 1010 via a communications subsystem. For example, light sensors, pressure sensors, thermal sensors, and/or other sensors may detect daylight, ambient pressure, ambient temperature, and/or other parameters, that are analyzed by the controller 1010 to control the valve 1030 and/or compressor 1040. The controller 1010 may determine, based on data detected with the sensors 1020 and/or received communication signals, that a lower altitude is required. Thus, the controller 1010 may send a control signal to the compressor 1040 to cause the compressor 1040 to provide more air to the SPB 300 to cause the LTA system 100 to descend. Alternatively, the controller 1010 may determine, based on data detected with the sensors 1020 and/or received communication signals, that a higher altitude is required. Thus, the controller 1010 may send a control signal to the valve 1030 to cause the valve 1030 to release air from the SPB 300 to cause the LTA system 100 to ascend. Further, the controller 1010 may control, in the manner discussed, the rate of air intake or air release in order to control, respectively, the rate of descent or ascent of the LTA system 100.

The controller 1010 is in communicating connection with a gimbal 1050. The gimbal 1050 may be the gimbal 500 described herein. The controller 1010 controls actuation of the gimbal 1050, for example actuation of the motor 510 of the gimbal 500. The controller 1010 controls actuation of the gimbal 1050 to control relative rotation of the ZPB 200 and SPB 300, for example to point the solar array 630 is a particular direction. The controller 1010 may control actuation of the gimbal 1050 based on output of the sensor 1020, and/or based on commands sent to the controller 1010 via a communications subsystem. For instance, light detectors, timers, global positioning systems (GPS), LTA system locators that are separate from but which communicate with the LTA system 100, and/or other sensors 1020, may provide data output or communications to the controller 1010. The controller 1010 may determine, based on data detected with the sensors 1020 and/or received communication signals, that rotation of the solar array 630 is required. The controller 1010 may then send a signal to the gimbal 1050 to actuate a particular amount. For instance, the controller 1010 may send a control signal to the gimbal 500 to cause the motor 510 to operate at a particular speed and/or for a particular amount of time. In some embodiments, the data is detected with the sensors 1020, and/or the communication signals are received, continuously or at regular intervals, such as during daylight, and provided to the controller 1010 for continuous or interval control of the solar array 630. Such operations may allow, for example, for tracking of the sun with the solar array 630 for optimal energy conversion.

The controller 1010 is in communicating connection with a payload 1060 and supporting subsystems 1070. The payload 1060 may be the payload 730 described herein. The supporting subsystems 1070 may be the various subsystem described herein, for example communications subsystem, release mechanisms, etc. The controller 1010 controls various operations of the payload 1060 and supporting subsystems 1070, for example gathering data with an optical instrument, taking readings with various sensors of the subsystems, transmitting and receiving information to and from ground stations, satellites, other balloon systems, etc. The controller 1010 may control the payload 1060 and supporting subsystems 1070 based on output of the sensor 1020, and/or based on commands sent to the controller 1010 via a communications subsystem. For instance, the controller 1010 may send a control signal to the payload 730 to take a sample or reading with an optical instrument. As further example, the controller 1010 may receive a communication signal to release the payload support 700, and the controller 1010 may then send a control signal to one or more release mechanisms to cause the payload support 700 and parafoil 680 to separate from the upper craft 600.

FIG. 7B is a schematic of an embodiment of a controller 1080 for controlling a riser release system and that may be used with the various LTA systems described herein, for example the LTA system 100. In some embodiments, the controller 1080 is in communicating connection with the control system 1000 and/or the various riser release systems described herein, such as those described with respect to FIGS. 8-16F. In some embodiments, the control system 1000 incorporates the controller 1080.

The controller 1080 may include a ground sensor 1082. The ground sensor 1082 may be, for example, a LEDAR or other system described herein, for example as described with respect to FIGS. 8-16F. The controller 1080 may include a riser release controller 1084. The controller 1084 may control the various riser release systems described herein, for example as described with respect to FIGS. 8-16F. The ground sensor 1082 may be in communicating connection with the riser release controller 1084. For example, the ground sensor 1082 may detect the system is within a threshold distance of a landing area, such as the ground, and communicate signals to the riser release controller 1084 which in response activates the riser release system, as further described herein.

H. Riser Release System

The various descent systems described herein, which may or may not be used with the LTA systems, may incorporate a riser release system. FIGS. 8-16F show embodiments of various riser release systems and methods and/or related components. The various systems and methods may incorporate or be used with various components described above. For instance, the controller 1080 may be used with the riser release systems and methods described herein.

The riser release auto flare system automatically flares a canopy, such as a parafoil canopy, parachute, etc., and slows descent and/or forward speed of a payload, upon controlled release of riser lines. The riser release system may slow descent and forward speed using only the weight of the payload to actuate the motion. In some embodiments of the riser release auto flare system, control lines connected to the tail of the canopy are fixed to the payload, while risers that connect to all the parachute/parafoil lines (except for the control lines) can be released and extended for a set extra length and at a desired rate, allowing the payload to fall lower beneath the parafoil and pull the control lines down during that process, thus flaring the canopy in a controlled manner.

Two mechanisms may be used in conjunction with releasable risers in the performance of the riser release system. The first mechanism employs altitude or ground sensing equipment that can identify when the unit is nearing the ground so that it can initiate the riser release. Without knowing the proximity of the system to the ground it will not know when to initiate the flare. The second mechanism is a device to control the distance and/or rate at which the risers release. If the release happens too quickly it could shock the system and potentially deflate the canopy or disrupt the flight dynamics, resulting in a bad landing. However, if the release happens too slowly, the dynamic flaring action may not execute correctly, leaving the system with too much speed at landing. The second mechanism may be used on a flight vehicle without the first mechanism.

To sense the distance to the ground, any mechanism capable of telling the distance between an object and a surface could be used. Preferably a LEDAR system (a light-emitting diode or LED detection and ranging system that uses LED lights instead of radio waves) system or a LIDAR system (a light detection and ranging system using focused light instead of radio waves) can be used. If the altitude of the ground at the place of landing is well known, GPS based altitude could alternatively be used. This embodiment preferably initiates the riser release at a known altitude above ground as the unit approaches a landing, and optionally controls the flaring process after initiation for a more precise flare if desired. In some embodiments, the ground sensing mechanism includes or is in communicating connection with the ground sensor 1082 as shown in FIG. 7B.

The release control device or mechanism to extend the risers and/or control the rate of release of the risers can be any device that is capable of extending the length of the riser lines and/or controlling the rate at which a tension connection is extended. The release control device may perform the function of controlling the rate of extending the riser length by any means. Thus, in some versions, the device may simply allow an extra amount of length to the riser lines. In some versions, the device may allow extra length as well as control the rate at which the extra length is paid out. The extra length may come from extra rise line and/or from another line coupled with the riser line. The "rate" refers to the distance per unit of time that the risers are allowed to move away from the payload (or other structure) when the risers are released from their release point. Introducing forces, such as friction, spring, compressive, tear-out or rip, etc., into the device will control this rate. As further described herein, some example release control devices and mechanisms for accomplishing this include a friction device that only lets the line pay out at a certain speed, a constant force spring to limit the pulling force of the payload on the control lines, a rip-stitch mechanism that will tear thread holding layers of strap together at a known rate, or an electronically controlled braking mechanism that can release the line at variable rates and pull forces. In some embodiments, the release control device includes or is in communicating connection with the riser release controller 1084 as shown in FIG. 7B. Other release control devices besides those explicitly described herein may be used, including but not limited to winches, capstans, bollards, poles, polygonal or segmented members, pipes, drums, rods, etc.

Functionally, when used, the parafoil approaches a landing site with a riser release auto flare system enabled and ground sensor active. When the ground sensor (or other means) senses (or otherwise detects or communicates) that the vehicle is a threshold distance off the ground (or other landing surface), for example twice the rigging length of the parafoil canopy, the unit activates the riser release by releasing the releasably coupled riser lines, for example by cutting a retention loop holding the risers down or otherwise together. As further described, the riser lines may be releasably coupled with the payload via one or more parachute risers and/or payload risers. When the risers are released, e.g. this loop is cut, the payload descends further beneath the parafoil due to the release of the risers, thus pulling down the control lines in the process. The riser lines may be, for example, one or more of the parafoil lines 682, for example as described with respect to FIGS. 5-6. The control lines may be separate from the riser lines and have a fixed length connecting the payload with the canopy. The rate at which the payload pulls down the control lines is preferably controlled by the release control device slowing the process by controlling the rate at which the risers, which have now been released from their release point, can fall away from the payload. The payload preferably has a near-zero forward speed and descent rate at the time it lands. In various embodiments, the threshold distance off the ground (or other landing surface) when the riser release system activates the release can be, for example in a range from one to ten times the rigging length of the parafoil canopy, in a range from 10 m to 100 m, or some other range.

Figure 8:
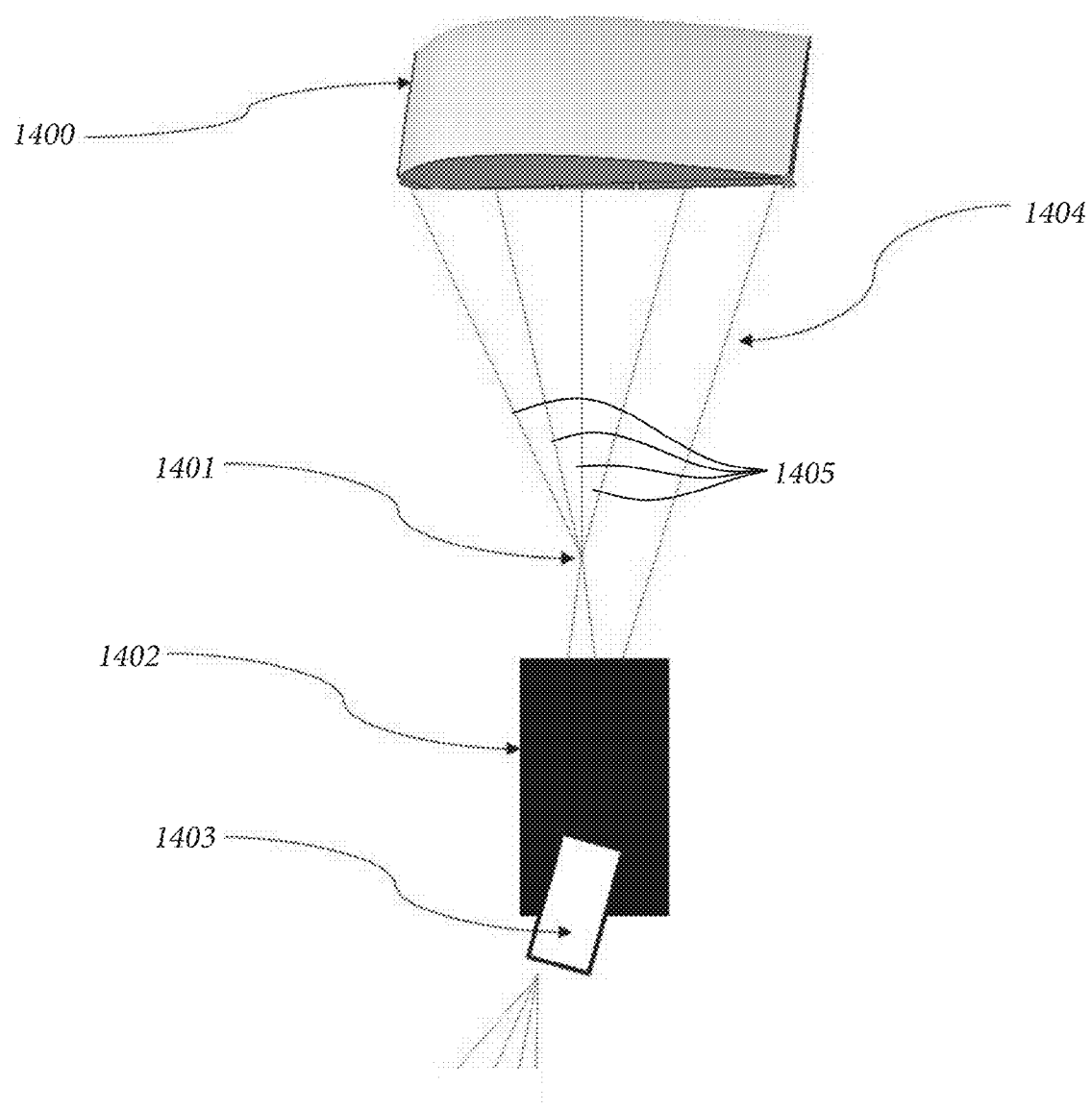
FIG. 8 shows a schematic of an embodiment of a descent system, that may be used with the various LTA systems described herein or any other flight systems, and having a LEDAR system to sense the distance to the ground and activate the release of parachute risers.

In some embodiments the riser release system includes an altitude or ground distance sensor. In one embodiment LEDAR ground sensing is used, as shown in FIG. 8. LEDAR system 1403 attaches to payload 1402 and senses the ground while flying under a canopy 1400, for example a canopy of a parafoil that provides upward lifting force to the descent vehicle. The LEDAR system 1403 may be the ground sensor 1082. The payload 1402 may be any of the payloads described herein, such as the payload 730 and/or payload support structure 700. The parafoil having the canopy 1400 may be any descent system, including but not limited to those described herein, for example the parafoil 680 and/or features thereof, such as the canopy 684. At the appropriate distance from the ground the system actuates the release of the riser lines 1405 connected to the payload attach harness at releasable point 1401. The riser lines 1405 may be attached at the releaseable point 1401 to releasable brackets, as further described herein. The riser lines 1405 may be the parafoil lines 682 or others as described herein. The riser lines 1405 will release a set distance from the payload and at a rate as controlled by a release control device, as further described herein. One or more control lines 1404 connect the canopy 1400 to the payload 1402. The control lines 1404 are not released, and thus are pulled down by the weight of the payload after release of the riser lines 1405 from the release point 1401. The LEDAR system could be replaced or augmented with LIDAR, RADAR, echo location, GPS altitude, or any device capable of determining the distance of the unit from the ground.

Figure 9:
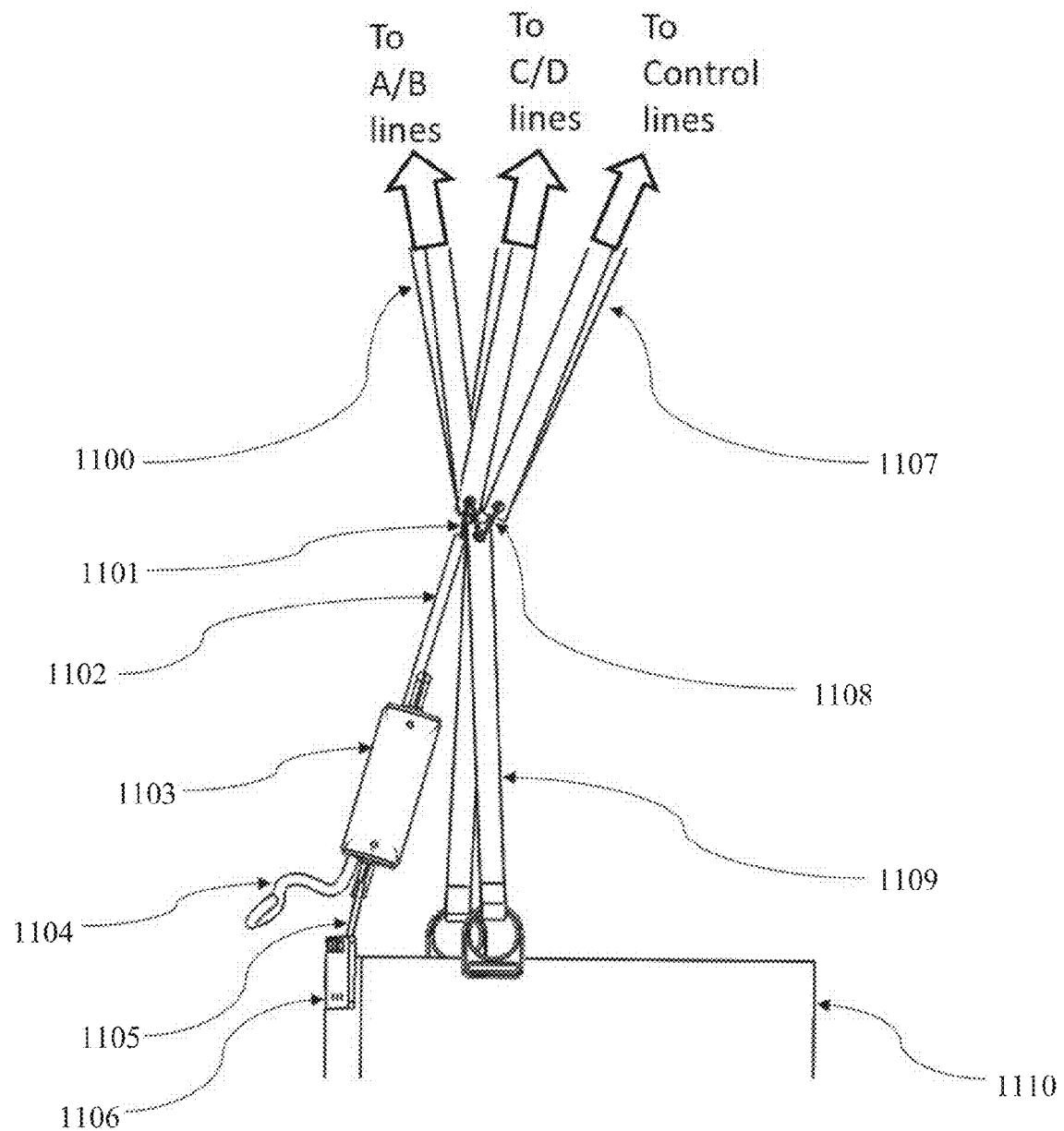
FIG. 9 shows an embodiment of a riser release auto flare system, which uses a friction device to slow the release process, that may be used with the various descent systems described herein.

In the embodiment shown in FIG. 9, a payload 1110 is flying under, and supported by, a parafoil (such as the canopy 1400 in FIG. 8) having a canopy for providing upward lifting forces, and preferably benefits from a soft landing. The payload 1110 may be any of the payloads described herein, such as the payload 1402, 730 and/or payload support structure 700. The payload 1110 may be any structure capable of coupling to the riser and control lines, as described herein. Thus the "payload" need not be the actual instrument, etc. but may be a payload structure, an intermediate structure, a bracket or fitting, etc. The parafoil may be any descent system, including but not limited to those described herein, for example the parafoil 1402 or 680. The canopy, such as a parachute or other fabric, plastic, polymer, etc. capable of providing an upward lifting force to the vehicle, may be coupled with the payload through parachute lines AB and/or C/D (not shown) that are attached to risers 1100. "Coupled with" or "connected with" and the like as used herein may refer to direct or indirect couplings or connections. For example, the various lines may be "coupled with" or "connected with" the payload either directly or indirectly via a harness and/or other parts, and "coupled with" or "connected with" the canopy either directly or indirectly via a fitting, attachment and/or other parts, etc. The parafoil lines may be the parafoil lines 682 or others as described herein. As shown, the risers 1100 are connected to payload harness 1109 through cut-loop 1101. The control lines 1404 (see FIG. 8) are connected to control lines 1107 which are connected to payload harness 1109 through static loop 1108. When the unit senses it is approaching the ground, at the appropriate altitude cut loop 1101 is cut, which releases riser lines 1100. The cut loop 1101 may be cut or otherwise severed with various suitable techniques, such as burn wires, mechanical knives or sharp edges, actuated members such as hooks, rotatable members, breakable members with stress concentrators that break from added load due to release of other lines, etc. In some embodiments, various suitable release mechanisms may be used instead of or in addition to the cut loop 1101, such as pyro-technic devices, electromechanical release devices, separation nuts ("sep-nuts"), or other suitable mechanisms.

When the riser lines 1100 are released the payload weight pulls down the control lines 1404. The rate at which the control lines 1404 are pulled down is controlled by the release control device, which in this embodiment is the friction device 1103, which is secured to the payload and so will be pulled down by the payload weight as well. Friction line 1102 is secured to riser lines 1100, so it will remain stationary while friction device 1103 descends. The friction line 1102 may be any rope, wire, line, etc. that wraps over, around, under, over, through, and/or otherwise with a corresponding holder, as further described. The friction line 1102 may be a friction rope or other elongated, friction-inducing, flexible member. The friction between friction device 1103 and friction line 1102 slows the release process, as friction between the rope 1102 and other components of the device 1103 determines the rate at which the rope 1102 pays out from the device. Friction device 1103 is secured to payload 1110 via attachment lanyard 1105 and structural attachment plate 1106. The final flare stroke can be controlled be either a stop knot in tail 1104 or by a long lanyard (not shown) that will stop the payload from descending after a certain distance. In some embodiments, there may be a stop knot in a genie that controls the length of travel of the risers 1100.

Figure 10:
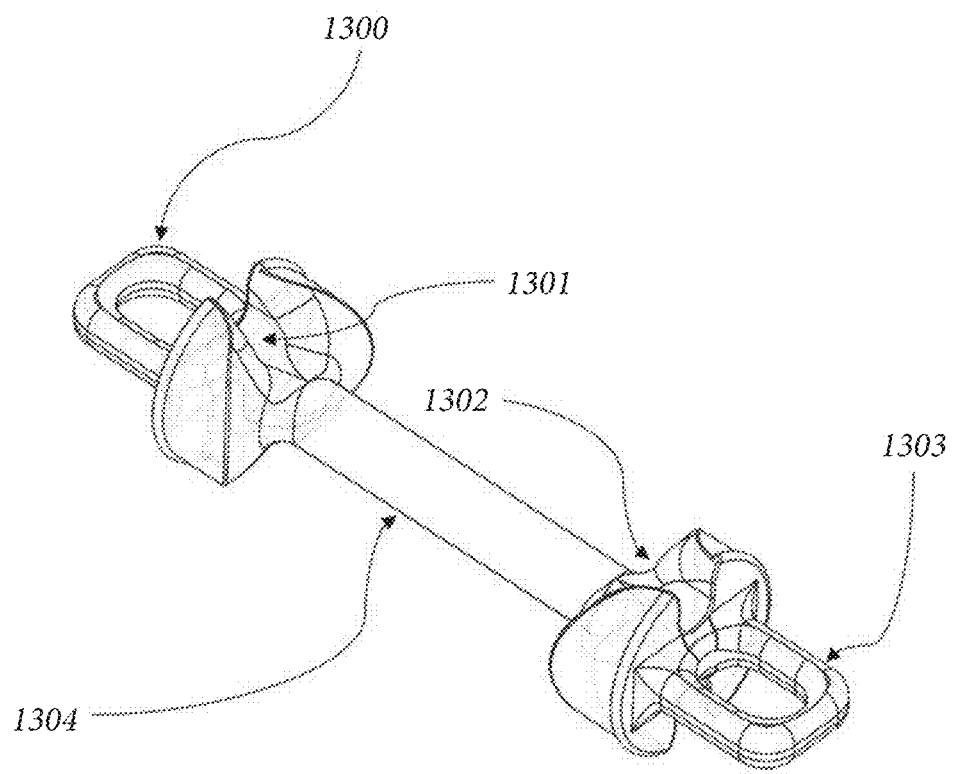
FIG. 10 shows an embodiment of a line friction device that may be used with the riser release auto flare system of FIG. 9.

FIG. 10 shows an embodiment of a friction device that may be used to control the rate of the flaring action once the risers 1100 are released. In this device, a rope such as friction line 1102 (see FIG. 9), optionally comprising 0.5 inch diameter nylon, enters the friction device unit through bottom pass through 1302, wraps around holder 1304, and then exits the unit through top pass through 1301. The unit is secured at the bottom via attachment loop 1303, for example to attachment lanyard 1105, so that the tension has a base to pull against. Top attachment loop 1300 is not mandatory, but can be used to secure the unit in-line with the tension line to avoid snags.

The holder 1304 may be any cylinder, rod, pole, pipe, drum etc. As shown, the holder 1304 is a smooth aluminum cylindrical rod comprising capped ends. Each of the two capped ends comprises two tapered slots preferably 180 degrees offset from each other; one slot on each end serves as pass through 1301 or 1302. Two pass through slots at the outlet of the unit allows the user to control the number of wraps in the unit with half turn precision, allowing more controllability of the friction provided by the device. More outlet holes could be added to provide even more precise control of the amount of friction the unit provides. There are preferably two inlet slots on the unit so that it is symmetric, and so that it provides an inlet option that is away from the structure it is being attached to, regardless of which way it is attached. An aluminum sheet metal cylinder (not shown) is preferably screwed or otherwise attached to the end caps to fully encase the internal rod and tapered slots. The cylindrical sheet metal sheath prevents the rope from unwinding off internal holder 1304. The eyelets on either side of the device are to mount to the payload in question. Using shackles or rated carabiners enables offset loading directions.

The device decelerates the object connected to it in a controlled way. This is achieved passively through friction between the rope and aluminum cylinder. When the cut loop 1101 is released, the device 1103 pays out the rope 1102, effectively lengthening the distance from the payload 1110 to the risers 1100 as the rope 1102 pays out from the device 1103, and causing the increased force on the control line 1107 and the subsequent flaring of the canopy. The rate of release of the risers from the payload is therefore controlled. The risers can move a fixed distance away from the payload, which distance depends on how much line is paid out from the release control device. The portion of the payload 1110 coupled to the lanyard 1105 drops, but at a controlled rate based on the friction of the rope 1102 in the device 1103. The number of wraps of friction line 1102 around holder 1304 determines the resultant friction and therefore the descent rate, and can be varied to achieve different amounts of friction, and therefore different flaring rates. To operate this device, the exterior sheet metal aluminum sheath is removed, and friction line 1102 is wrapped around holder 1304 as many turns (preferably in half-turn increments) as is desired for reduced deceleration. The rope must pass through the slots in the end caps to allow the exterior sheet metal sheath to fit back over the device. Alternatives to this friction device include a descender rack (rack and bar system) comprising a U-bend aluminum rod supporting aluminum cylinders that can be added or subtracted as necessary. The rope is fed over-under between the aluminum cylinders to achieve desired friction/decent rate. Or, a Miller Descent system can be used, comprising an internal cylinder having a machined helical slot that accommodates rope along a designated path. However, with this system the number of turns/resulting friction is not adjustable.

Figure 11:
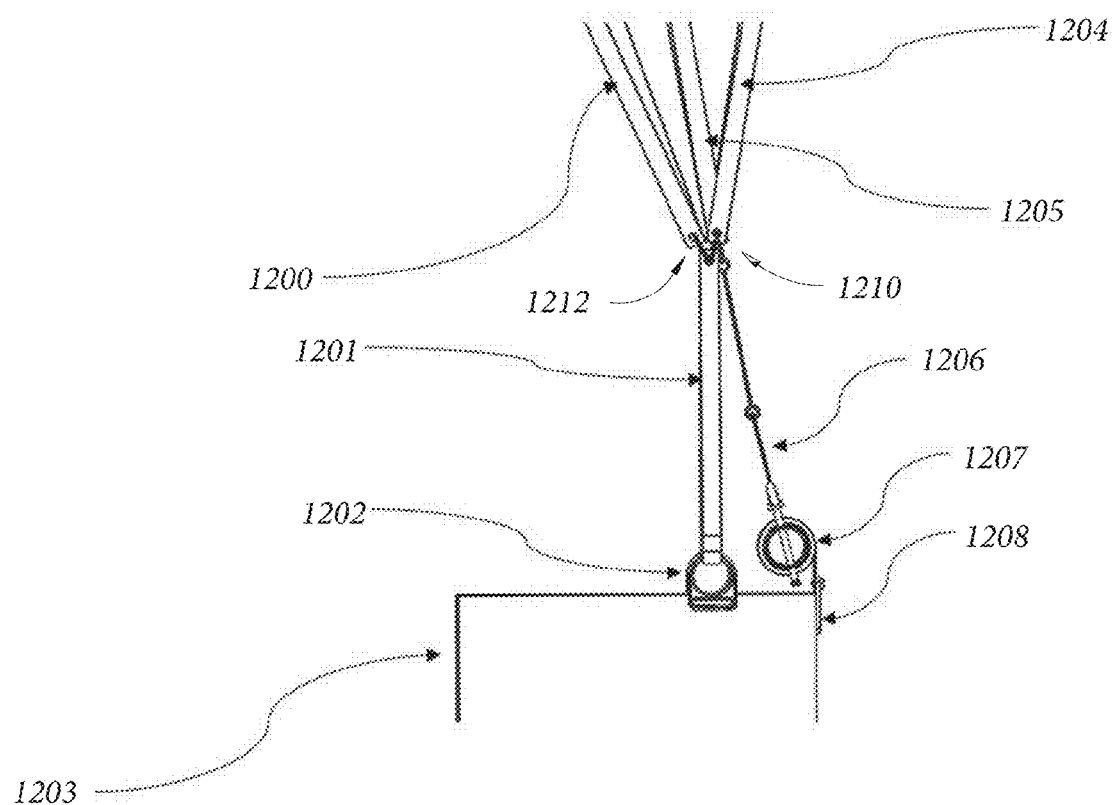
FIG. 11 shows an embodiment of a riser release auto flare system, which uses a constant force spring system to control the release process, that may be used with the various descent systems described herein.

The embodiment shown in FIG. 11 uses constant force springs to control the rate of release when used to flare a parafoil or other descent system. This embodiment is similar to the embodiment shown in FIG. 9, except instead of using a line friction device to slow the release process it uses constant force springs to control the line tension on the control lines. In this embodiment payload 1203 preferably benefits from a soft landing. The payload 1203 connects to payload harness 1201 through attachment ring(s) 1202. Riser lines 1204, 1205 are connected to payload harness 1201 with a releasable loop 1210. The riser lines 1204, 1205 may include risers such as parachute risers to which the riser lines 1204, 1205 connect. For example, the riser lines 1204, 1205 may be connected with the payload harness 1201 via risers, such as parachute risers. Control lines 1200 are attached to payload harness 1201 through a permanent loop 1212. Riser lines 1204, 1205 are also connected via lanyard 1206 to constant force spring assembly 1207, which is connected to the payload via attachment plate 1208.

At the predetermined distance from the ground, in some embodiments the system activates the auto flare by severing the releasable loop 1210 connecting the riser lines 1204, 1205 from payload harness 1201. The releasable loop 1210 may be severed in a a variety of suitable techniques, such as those described with respect to the cut loop 1101, or other techniques. Payload 1203, or portions thereof, is then free to drop (or rotate, for example) farther down relative to the canopy, its weight pulling the control lines 1200 down in the process. Because payload 1203 is connected to riser lines 1204, 1205 through constant force spring assembly 1207, the tension on the control lines 1200 is not the full weight of the payload 1203, but instead is the weight of the payload 1203 less the force applied by the constant force spring assembly 1207. The constant force spring assembly 1207 contains a spring for which the force it exerts over its range of motion is constant or approximately constant, or is otherwise within a specified range. The constant force spring assembly 1207 can include a constant-force springs constructed as a rolled ribbon of spring steel such that the spring is relaxed when it is fully rolled up. As it is unrolled, the restoring force comes primarily from the portion of the ribbon near the roll. Because the geometry of that region remains nearly constant as the spring unrolls, the resulting force is nearly constant. That force can be selected to be any value to achieve a good flare. For example if the force is selected to be ⅔ of the weight of the payload 1203, the tension, or pull-down force, on the control lines 1200 is equal to ⅓ of the weight of the payload 1203. The total stroke of the flare can be controlled by an additional long lanyard (not shown), which stops payload 1203 from descending away from the canopy more than a certain distance by connecting payload 1203 to riser lines 1204, 1205 with an appropriate amount of extra slack to allow the flare to occur.

Figure 12:
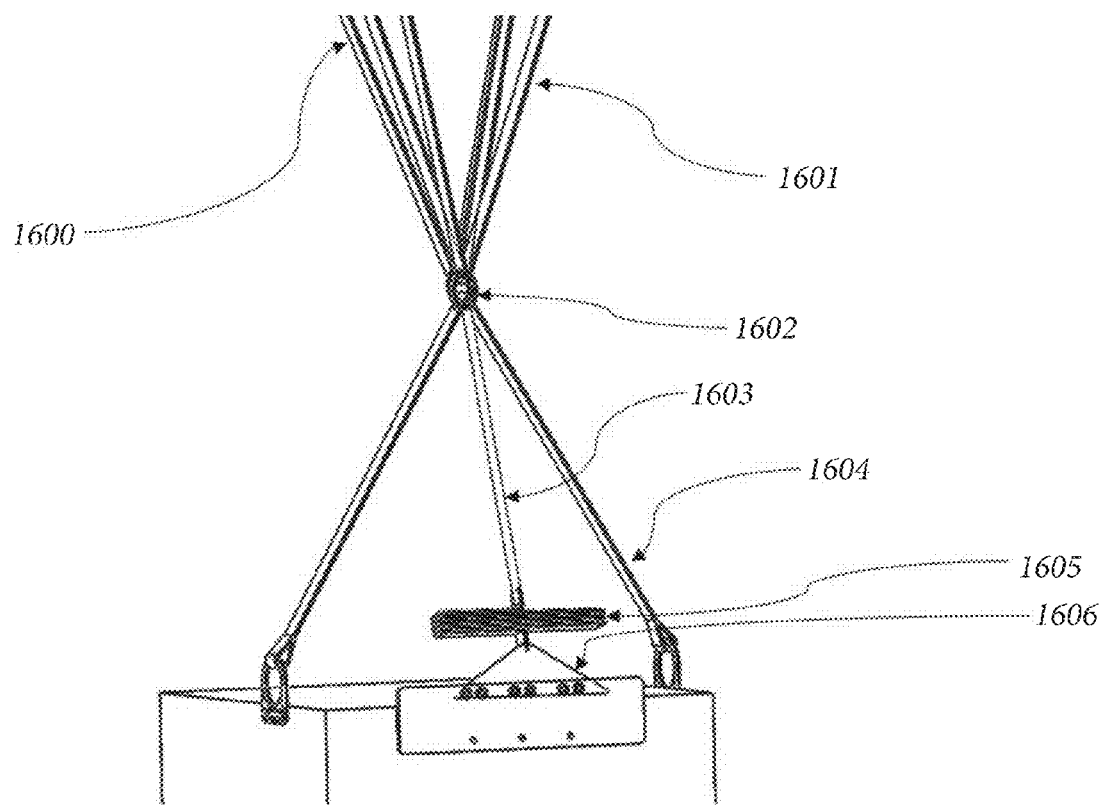
FIG. 12 shows an embodiment of a riser release auto flare system, which uses a rip stitch system to control the release process, that may be used with the various descent systems described herein.
Figure 13:
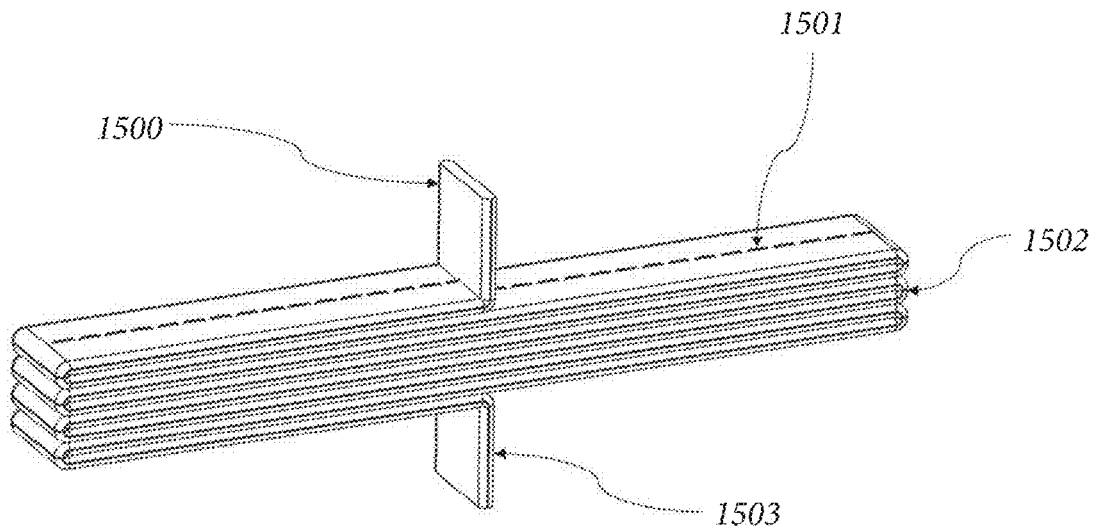
FIG. 13 shows an embodiment of a rip stitch strap that may be used with the riser release auto flare system of FIG. 12.

The embodiment shown in FIG. 12 and FIG. 13 uses rip stitching to control the rate of flare. This embodiment is similar to the embodiment shown in FIG. 9, except instead of using a line friction device to slow the release process it uses a rip stitch device to control the flaring rate. In this embodiment, riser lines 1601 are connected to the payload through attachment harness 1604 and cut loop 1602. Control line risers 1600 are permanently connected to payload harness 1604. Riser lines 1601 are permanently connected to attachment lanyard 1603 that connects to rip stitch device 1605, which connects to the payload through a payload attachment plate 1606. At the desired distance from the ground, the system activates the auto flare by cutting cut loop 1602, thereby releasing riser lines 1601 from payload harness 1604. The cut loop 1602 may be cut or otherwise severed, separated, etc. in a variety of suitable techniques, such as those described with respect to the cut loop 1101, or other techniques. The weight of the payload pulls down control line risers 1600. The rate at which the control lines are pulled down is controlled by rip stitch assembly 1605.

A detailed view of the rip stitch assembly is shown in FIG. 13. The rip stitch assembly preferably comprises folded nylon webbing or strap 1502, or a similar structural strap or rope. Payload leg 1503 attaches to the payload or the connection web, and riser leg 1500 attaches to the riser lines 1601 via the cut loop 1602. The strap is preferably folded in an "S" pattern back and forth, and stitched to itself using thread 1501 during the folding process. When riser leg 1500 is pulled apart from payload leg 1503, thread 1501 is loaded. When the load exceeds the thread strength, thread 1501 will rip, enabling the strap to extend. The strength of thread 1501 dictates the force at which the strap will extend, and the spacing of thread 1501 dictates the rate at which the strap extends. Stronger thread 1501 will take more force to activate, and more tightly spaced thread will extend more slowly. Both thread strength and thread spacing can be varied along the length of the rip in order to achieve a specific flare profile as desired.

Figure 14:
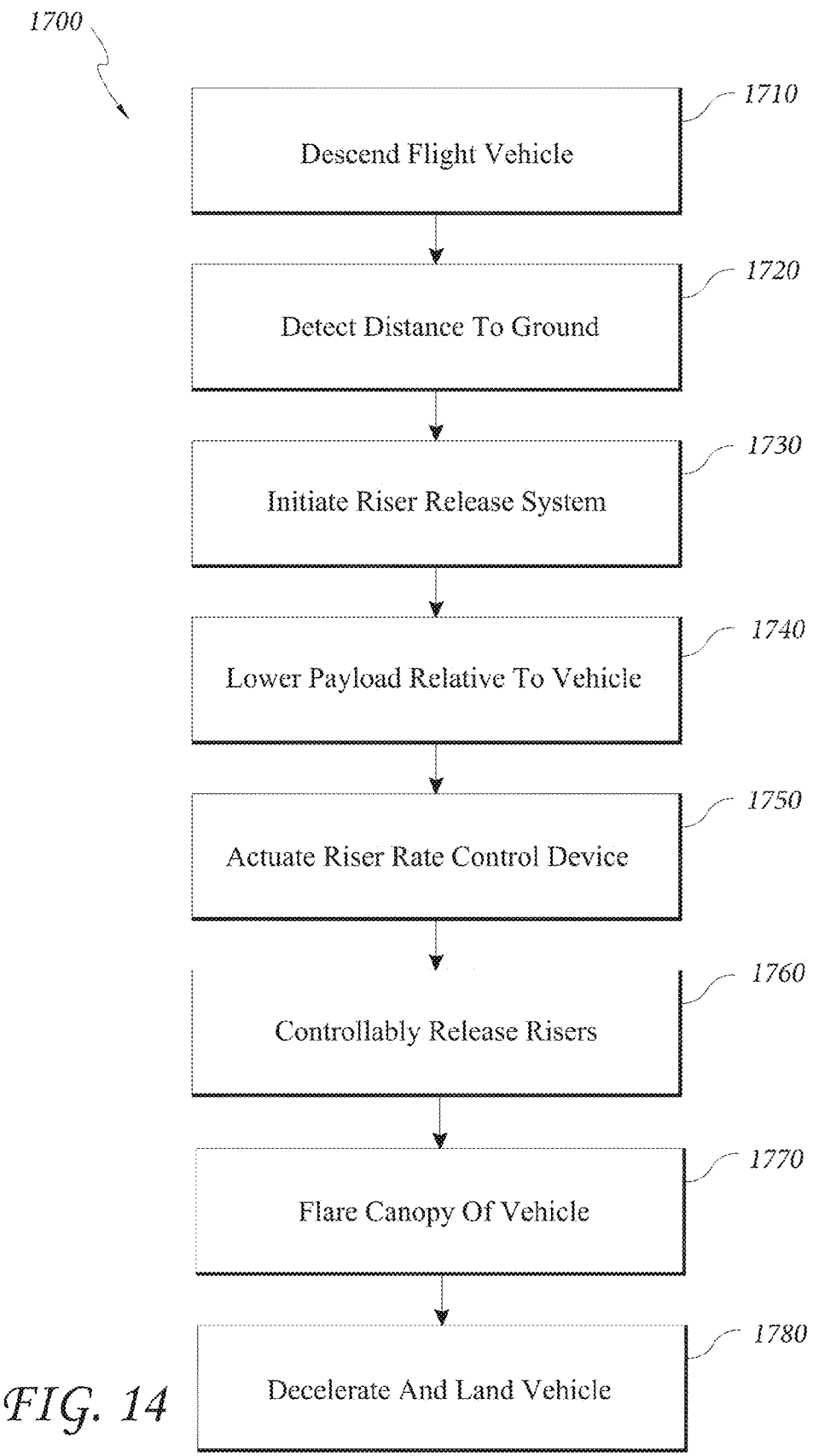
FIG. 14 is a flowchart showing an embodiment of a method for using the various riser release systems described herein to safely and controllably land a flight vehicle.

FIG. 14 is a flowchart showing an embodiment of a method 1700 for using the various riser release systems described herein to safely and controllably land a flight vehicle. The method 1700 may be used with the various descent systems described herein and/or other flight systems.

The method 1700 begins with step 1710 wherein a flight vehicle descends. The various descent systems described herein may be used, such as the parafoil 680, 1400, etc. The vehicle may include one or more payloads, such as the payload 730, 1110, etc. A canopy, such as a parafoil or other fabric-like component may be used for controlled descent.

The method 1700 then moves to step 1720 wherein the distance from the vehicle to the ground is detected. The distance may be detected with the various sensors and controllers described herein, such as the LEDAR system 1403, the ground sensor 1082, etc. In some embodiments, in addition or alternatively to these sensors, other means for determining distance to ground or other landing areas may be used, such as GPS, visual determination, sonar, etc.

The method 1700 then moves to step 1730 wherein the riser release system is initiated. The riser release system may be initiated in response to determining that the vehicle is within a threshold distance of ground and/or travelling at a threshold descent rate. In step 1730, the riser release system may be any of the embodiments described herein, such as those described with respect to FIGS. 8-16F. The riser release system may be initiated manually or automatically in step 1730. In some embodiments of step 1730, the control system 100 and/or controller 1080, such as the riser release controller 1084, is/are used to initiate the riser release system. One or more commands may be sent from the various controllers to one or more portions of the riser release system, such as the cut loop 1101, releasable loop 1210, cut loop 1602, etc. These or other release devices may cause one or more riser lines to release. In some embodiments of step 1730, the cut loop 1101 may be cut to release riser lines 1100. In some embodiments of step 1730, the releasable loop 1210 connecting the riser lines 1204, 1205 is severed from the payload harness 1201. In some embodiments of step 1730, the cut loop 1602 is cut, thereby releasing riser lines 1601 from the payload harness 1604.

The method 1700 then moves to step 1740 wherein the payload lowers relative to the vehicle. For example, the payload or portions thereof may lower relative to a canopy, such as a parafoil, parachute, etc. The movement, for example dropping, rotating, dropping and rotating, etc., of the payload may cause the risers to release as described herein. In some embodiments of step 1740, the payload weight pulls down the control lines 1404. In some embodiments of step 1740, the payload 1203 drops relative to the canopy, its weight pulling the control lines 1200 down in the process. In some embodiments of step 1740, the weight of the payload pulls down control line risers 1600.

The method 1700 then moves to step 1750 wherein the riser rate control device is actuated. The riser rate control device in step 1750 may be any of the devices described herein, such as the friction device 1103, the constant force spring assembly 1207, the rip stitch assembly 1605, etc. In step 1750, the various devices may operate as described above in order to control the rate at which the various lines are pulled down by the lowering payload. In some embodiments of step 1750, the friction line 1102 unwraps from around the holder 1304. In some embodiments of step 1750, the constant force spring assembly 1207 provides a constant release force on the pulling lines. In some embodiments of step 1750, thread 1501 of the rip stitch assembly 1605 will rip allowing the strap to extend.

The method 1700 then moves to step 1760 wherein the canopy is flared. The canopy in step 1760 may be any of the canopies, parachutes, etc. described herein, such as with parafoils or other flight vehicles. The canopy may flare as the release lines are controllably released in any or all of steps 1730, 1740, 1750 or 1760. In step 1760, the flaring of the canopy may cause the vehicle to decrease in descent and/or forward velocities. In some embodiments, the flaring in step 1760 causes the vehicle to have near-zero velocities in the downward and/or forward directions. The method 1700 then moves to step 1770, wherein the vehicle lands. The vehicle may land on ground, a landing pad, a ship or any other suitable landing surface.

Figure 16F:
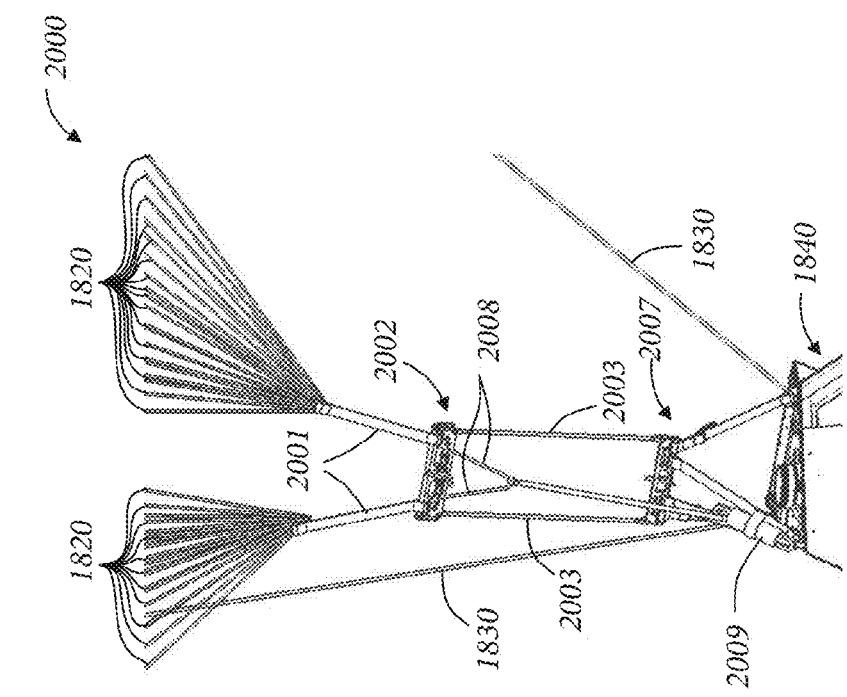
FIGS. 16E and 16F are front and perspective views, respectively, of the riser release auto flare system of FIGS. 16A and 16B shown in a released state.
Figure 16E:
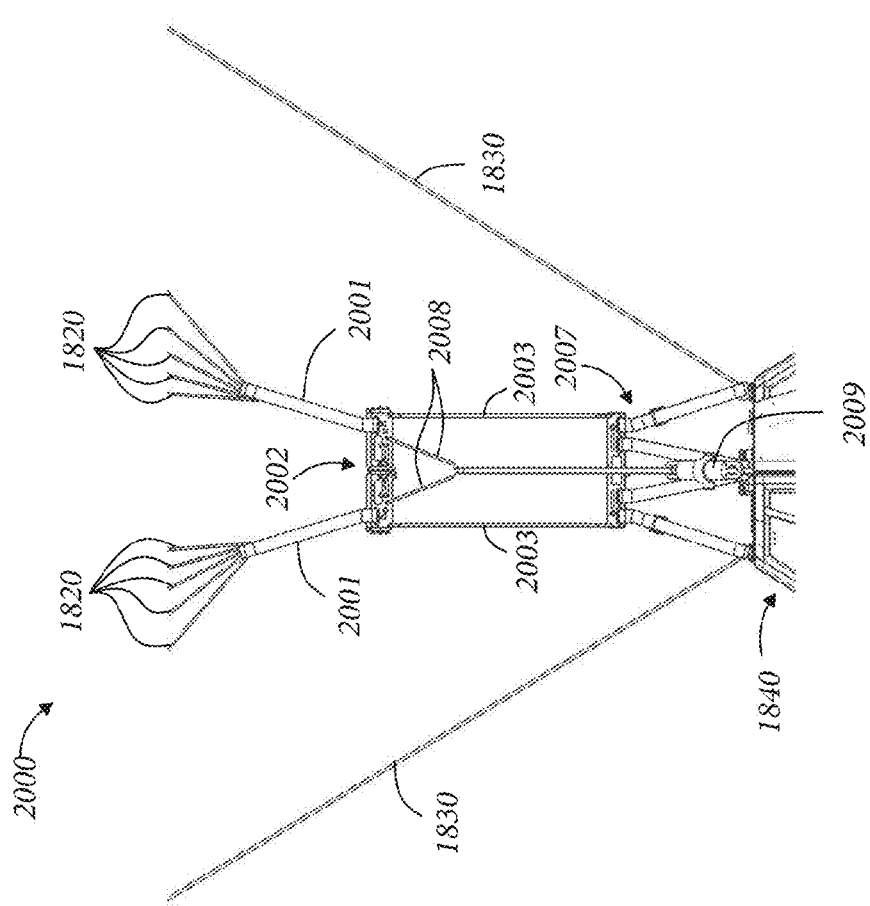

FIGS. 15A and 15B are front and back views of another embodiment of a riser release auto flare system 2000 that may be used with the various descent systems described herein. FIGS. 16A and 16B are perspective views of an embodiment of a parafoil 1800 having the riser release auto flare system 2000. FIG. 16A depicts the parafoil 1800 with the system 2000 in an unreleased state, and FIG. 16B depicts the parafoil 1800 with the system 2000 in a released state where a canopy 1810 has been flared due to release of the system 2000. FIGS. 16C and 16D are close up front and perspective views, respectively, of the riser release auto flare system 2000 shown in an unreleased state and attached with the parafoil 1800. FIGS. 16E and 16F are front and perspective views, respectively, of the riser release auto flare system of FIGS. 16A and 16B shown in a released state and attached with the parafoil 1800.

The riser release auto flare system 2000 may be used with a flight vehicle such as the parafoil 1800. The parafoil 1800 may have the canopy 1810 to provide an upward lifting force. The parafoil 1800 may carry a payload 1840. One or more riser lines 1820 may connect the canopy 1810 with the payload 1840 via the riser release auto flare system 2000. One or more control lines 1830 may connect the canopy 1810 directly with the payload 1840. The control lines 1830 may connect with one or another side of the canopy 1810, such as the front side or edge of the canopy 1810.

The riser release auto flare system 2000 may include one or more payload risers 2005, a lower bracket 2007, an upper releasable bracket 2002 and parachute risers 2001. The payload risers 2005 may connect the payload 1840 to the canopy 1820, which may be a parafoil canopy, parachute, etc., via the lower bracket 2007, the upper releasable bracket 2002, the parachute risers 2001, and one or more control lines. The parachute risers 2001 may connect with one or more of the riser lines 1820. In some embodiments, there may not be any parachute risers 2001 such that the riser lines 1820 may be connected directly with the upper releasable bracket 2002. The two brackets 2002, 2007 may be releasably coupled together. As shown, the two brackets 2002, 2007 may be releasably coupled together with a cut cord 2006. Other devices and systems besides or in addition to cut cords may be implemented to releasably couple the two brackets 2002, 2007 together.

The upper bracket 2002 may also be attached to the payload 1840 via a release control device 2009 and a connection cord 2008 linking the release control device 2009 with the upper bracket 2002. The release control device 2009 may control the distance and/or rate at which the two brackets 2002, 2007 separate from each other upon actuation of a releasing device 2004. The release control device 2009 may be a variety of suitable devices, including but not limited to the various release control devices such as the friction device of FIGS. 9-10, the spring device of FIG. 11, or the rip stitch device of FIGS. 12-13. At the desired altitude above the ground, which may be based on a distance to ground detected by a ground sensor as described herein, the releasing device 2004 de-couples the brackets 2002, 2007 from proximity to each other, for example severs the cut cord 2006, allowing the upper bracket 2002 to release from the lower bracket 2007. In some embodiments, other devices and systems besides a cut cord and corresponding releasing device may be used, and the cut cord is merely an example of one way to release the two brackets from each other. The releasing device 2004 may be any of a variety of suitable release devices, including but not limited to the cut loop 1101, the releasable loop 1210, etc. The brackets 2002, 2007 are shown in their released state and separated from each other in FIGS. 16B and 16E-16F. The brackets 2002, 2007 may separate from each other over a set distance, and therefore may effectively add such distance to the length of the riser lines, for example a set distance of between about 6 inches and 240 inches, or other distances.

During this process, the release control device 2009 is tensioned and controlling the rate at which the lower bracket 2007 separates from the upper bracket 2002. The upward lifting force from the parafoil/parachute canopy 1810 and/or the downward gravitational force on the payload 1840 may cause the brackets 2002, 2007 to separate after release of the brackets 2002, 2007 from each other. The control lines 1830 extending from the parafoil canopy 1810 are fixed to the payload 1840 and so functionally tension and pull down the tail of the canopy 1810 during this process. The distance that the lines 1830 are pulled may be controlled by one or more limiter lines 2003 that can be sized to any length to create desirable landing characteristics. There may be two limiter lines 2003 as shown. The limiter line 2003 may limit the distance the two brackets 2002, 2007 may separate from each other. The separation of the brackets 2002, 2007 effectively adds extra length of riser line 1820 to effectively lengthen the riser lines 1820 relative to the control lines 1830, or in other words effectively shorten the control lines 1830 relative to the riser lines 1820, thus causing the control lines 1830 to tension and pull on the canopy 1810. This pull on the canopy 1810 may cause it to flare, thereby causing the descending flight vehicle, such as the parafoil 1800, to decrease a descent rate. In some embodiments, the flare of the canopy 1810 also causes a decrease in forward speed as well. The canopy 1810 is shown flared in FIG. 16B, where the control lines 1830 have "pulled" down on the side of the canopy 1810 to cause the flare.

The riser release auto flare system 2000 may be employed with any descent vehicle having a canopy, parachute, or other similar type features, whether a parafoil or otherwise. The system 2000 may be employed on such descent vehicle, whether such descent vehicle is used with an LTA system, aircraft, or other systems. In some embodiments, the descent vehicle is used alone and is not used in conjunction with any other flight system.

Although the invention has been described in detail with particular reference to the disclosed embodiments, other embodiments can achieve the same results. Variations and modifications of the present invention will be obvious to those skilled in the art and it is intended to cover all such modifications and equivalents. The entire disclosures of all patents and publications cited above are hereby incorporated by reference.

The flow chart sequences are illustrative only. A person of skill in the art will understand that the steps, decisions, and processes embodied in the flowcharts described herein may be performed in an order other than that described herein. Thus, the particular flowcharts and descriptions are not intended to limit the associated processes to being performed in the specific order described.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

The foregoing description details certain embodiments of the systems, devices, and methods disclosed herein. It will be appreciated, however, that no matter how detailed the foregoing appears in text, the systems, devices, and methods may be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment may be included with other depicted embodiments in any combination. For example, any of the various components described herein and/or depicted in the Figures may be combined, interchanged or excluded from other embodiments.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches. For example, terms such as about, approximately, substantially, and the like may represent a percentage relative deviation, in various embodiments, of ±1%, ±5%, ±10%, or ±20%.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. A riser release system for controllably landing a descending flight vehicle, the flight vehicle having a payload suspended underneath a parafoil canopy wherein the parafoil canopy has a leading edge and a trailing edge or tail, the riser release system comprising:
    a plurality of control lines, each control line having a first end fixedly connected with the tail of the canopy and a second end fixedly connected with the payload;
    a plurality of riser lines, each riser line having a first end fixedly connected with the canopy and a second end; and
    a release system configured to control a distance the second ends of the one or more riser lines travel from the payload, the release system comprising:
        an upper bracket fixedly connected to the riser line second ends;
        a lower bracket fixedly connected to the payload;
        a coupling mechanism releasably coupling the upper bracket to the lower bracket;
        a de-coupling mechanism for de-coupling the upper bracket from the lower bracket and configured to cause the upper bracket to separate a distance from the lower bracket;
        a distance control device for controlling the distance of separation of the brackets; and
        a rate control device coupled to at least the upper bracket and configured to resist separation and control the rate of separation.

2. The riser release system of claim 1, wherein the rate control device comprises a friction device.

3. The riser release system of claim 1, further comprising a ground sensor configured to detect a distance from the flight vehicle to a landing surface below the flight vehicle,
    wherein the second ends of the riser lines are configured to be released in response to the ground sensor detecting that the distance from the flight vehicle to the landing surface is within a threshold distance.

4. The riser release system of claim 3, wherein the ground sensor comprises a light-emitting diode detection and ranging (LEDAR) system or a light detection and ranging (LIDAR) system.

5. The riser release system of claim 1, wherein the release system is fixedly connected to the second ends of the riser lines via one or more parachute risers, and the release system is fixedly connected to the payload via one or more payload risers.

6. The riser release system of claim 1, wherein the rate control device comprises:
   a holder; and
   a friction line having a first end connected to the plurality of riser lines and a second end connected to the payload, and a length of the friction line located between the first and second ends is configured to wrap against the holder,
   wherein release of the one or more riser lines causes the friction line to at least partially slide through the holder and payout from the friction device at a controlled rate due to friction between the friction line and the holder.

7. The riser release system of claim 6, wherein the holder is a cylinder and the friction line is a friction rope wrapped at least partially around the cylinder.

8. The riser release system of claim 1, wherein the rate control device comprises a spring connecting the upper bracket to the payload, and wherein release of the riser lines causes the spring to payout at a controlled rate.

9. The riser release system of claim 1, wherein the rate control device comprises
   a strap having a first end and a second end, the first end coupled with the upper bracket, and the second end coupled with the payload; and
   a thread coupled with the strap,
   wherein the thread is configured to rip at a controlled rate in response to a load applied to the thread via the strap that exceeds a threshold load, thus allowing the strap to release at a controlled rate.

10. The riser release system of claim 9, wherein the first end of the strap is coupled with the upper bracket via a riser leg, and the second end of the strap is coupled with the payload via a payload leg.

11. The riser release system of claim 3, further comprising an electronic controller in communicating connection with the ground sensor, the controller configured to automatically decouple the upper bracket and lower bracket via the coupling mechanism in response to the ground sensor detecting that the distance from the flight vehicle to the landing surface is within the threshold distance.

12. A riser release system for a flight vehicle having a payload and a canopy, the riser release system comprising:
   a plurality of lines coupled with the canopy and the payload, wherein the lines comprise riser lines and control lines; and
   a release structure comprising:
      an upper portion fixedly connected to the riser lines;
      a lower portion fixedly connected to the payload;
      a coupling mechanism releasably coupling the upper portion to the lower portion and configured to cause the upper portion to separate a distance from the lower portion upon release;
      a distance control device for controlling the distance of separation of the portions; and
      a rate control device coupled to the release structure and configured to resist separation and control the rate of separation.

13. The riser release system of claim 12, further comprising a ground sensor configured to detect a distance from the flight vehicle to the surface below the flight vehicle, and a controller in communicating connection with the ground sensor and the coupling mechanism, wherein the controller is configured to separate the upper portion and the lower portion of the release structure in response to the distance being within a threshold distance.

14. The riser release system of claim 12, wherein the rate control device comprises a friction device, a constant force spring, or a rip stitch device.

15. A method for landing a flight vehicle having a payload coupled with a canopy via one or more control lines and one or more riser lines, the method comprising:
   releasing a release system to increase a distance between one or more riser lines from the payload, the release system comprising an upper portion and a lower portion, wherein the one or more riser lines are fixedly connected to the upper portion;
   controlling the distance the riser lines separate from the payload;
   controlling the rate at which the one or more riser lines separate from the payload; and
   flaring the canopy with the one or more control lines due to an increased load on the control lines from the payload caused by release of the riser lines.

16. The method of claim 15, wherein controlling the rate at which the one or more released riser lines travel the set distance using a friction device.

17. The method of claim 15, wherein controlling the rate at which the one or more riser lines separate from the payload comprises a) unwinding a friction line from a holder by pulling on the friction line with the one or more riser lines, b) extending a constant force spring by pulling on the spring with the one or more riser lines, or c) ripping a rip stitch thread from a strap by pulling on the strap with the one or more riser lines and thereby causing the strap to extend.

18. The method of claim 15, further comprising determining a distance from the flight vehicle to the ground, and wherein the one or more riser lines are released in response to the distance from the flight vehicle to the ground being less than a threshold distance.

* * * * *

UNITED STATES PATENT AND TRADEMARK OFFICE
CERTIFICATE OF CORRECTION

PATENT NO. : 9,868,537 B2  
APPLICATION NO. : 15/486241  
DATED : January 16, 2018  
INVENTOR(S) : Jared Leidich et al.

Page 1 of 1

It is certified that error appears in the above-identified patent and that said Letters Patent is hereby corrected as shown below:

In Column 36 at Line 36, In Claim 1, after "second ends of the" delete "one or more".

In Column 38 at Line 37, In Claim 16, after "travel the" delete "set".

Signed and Sealed this  
First Day of May, 2018

Andrei Iancu  
*Director of the United States Patent and Trademark Office*